United States Patent
Senapati et al.

(10) Patent No.: US 10,255,073 B2
(45) Date of Patent: Apr. 9, 2019

(54) MICROCONTROLLER WITH VARIABLE LENGTH MOVE INSTRUCTIONS USING DIRECT IMMEDIATE ADDRESSING OR INDIRECT REGISTER OFFSET ADDRESSING

(71) Applicant: Microchip Technology Incorporated, Chandler, AZ (US)

(72) Inventors: Ashish Senapati, Tempe, AZ (US); Sean Steedman, Phoenix, AZ (US); Brent Loertscher, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/592,551

(22) Filed: May 11, 2017

(65) Prior Publication Data

US 2017/0329611 A1 Nov. 16, 2017

Related U.S. Application Data

(60) Provisional application No. 62/335,446, filed on May 12, 2016.

(51) Int. Cl.
*G06F 9/30* (2018.01)
*G06F 1/08* (2006.01)
(Continued)

(52) U.S. Cl.
CPC ............ *G06F 9/30149* (2013.01); *G06F 1/08* (2013.01); *G06F 9/3004* (2013.01);
(Continued)

(58) Field of Classification Search
CPC .......................... G06F 9/30032; G06F 9/3004
See application file for complete search history.

(56) References Cited

U.S. PATENT DOCUMENTS 5,751,988 A 5/1998 Fujimura .................... 711/5
6,496,920 B1 * 12/2002 Zou ..................... G06F 9/30014
712/33

(Continued)

OTHER PUBLICATIONS

Texas Instruments "MSP430FR5739-EP Mixed-Signal Microcontrollers" SLVSCN6A—Nov. 2014—Revised Dec. 2014 (Year: 2014).*

(Continued)

*Primary Examiner* — Jacob Petranek
(74) *Attorney, Agent, or Firm* — Slayden Grubert Beard PLLC

(57) ABSTRACT

An 8-bit microprocessor has a program memory having a 16-bit instruction word size and a data memory having an 8-bit data size. An instruction word has a payload size for an address of up to 12 bits. The microprocessor furthermore has a central processing unit coupled with the program memory and the data memory, a bank select register configured to select one of up to 64 memory banks, and an indirect addressing register operable to address up to 16KB of data memory. The CPU is configured to execute a first move instruction having two instruction words and being configured to only access the lower 4KB of the data memory and a second move instruction having three instruction words and configured to access the entire data memory.

22 Claims, 29 Drawing Sheets

| MNEMONIC, OPERANDS | DESCRIPTION | | CYCLES | 16-BIT INSTRUCTION WORD | | STATUS AFFECTED |
|---|---|---|---|---|---|---|
| | | | | MSb | LSb | |
| MOVFF $f_s, f_d$ | MOVE $f_s$ (SOURCE) TO | 1st WORD | 2 | 1100 ffff ffff ffff | | NONE |
| | $f_d$ (DESTINATION) | 2nd WORD | | 1111 ffff ffff ffff | | |
| MOVFFL $f_s, f_d$ | MOVE $f_s$ (SOURCE) TO | | 3 | 0000 0000 0110 ffff | | NONE |
| | g (FULL DESTINATION) | | | 1111 ffff ffff ffgg | | |
| | $f_d$ (FULL DESTINATION) | 3rd WORD | | 1111 gggg gggg gggg | | |

(51) Int. Cl.
  *G06F 13/40* (2006.01)
  *G06F 9/34* (2018.01)
(52) U.S. Cl.
  CPC ...... *G06F 9/30032* (2013.01); *G06F 9/30145* (2013.01); *G06F 9/30167* (2013.01); *G06F 9/30178* (2013.01); *G06F 9/30185* (2013.01); *G06F 9/342* (2013.01); *G06F 13/4018* (2013.01)

(56) References Cited

U.S. PATENT DOCUMENTS

| | | | | |
|---|---|---|---|---|
| 6,708,268 | B1 * | 3/2004 | Boles | G06F 9/30032 |
| | | | | 712/220 |
| 7,594,094 | B2 * | 9/2009 | Greiner | G06F 9/30032 |
| | | | | 711/164 |
| 7,606,932 | B1 * | 10/2009 | Cypher | G06F 15/17337 |
| | | | | 370/470 |
| 2004/0024989 | A1 * | 2/2004 | Chauvel | G06F 9/30134 |
| | | | | 712/41 |
| 2007/0121162 | A1 * | 5/2007 | Hutchison | G06F 12/0215 |
| | | | | 358/1.17 |
| 2009/0144481 | A1 * | 6/2009 | Julicher | G06F 9/461 |
| | | | | 711/5 |
| 2009/0144511 | A1 * | 6/2009 | Julicher | G06F 9/30181 |
| | | | | 711/154 |
| 2010/0205346 | A1 | 8/2010 | Lundstrum et al. | 711/5 |
| 2015/0227373 | A1 * | 8/2015 | Mudawar | G06F 9/30058 |
| | | | | 712/205 |

OTHER PUBLICATIONS

International Search Report and Written Opinion, Application No. PCT/US2017/032321, 11 pages, dated Aug. 9, 2017.

* cited by examiner

BANKSEL REGISTER

| U-0 | U-0 | R/W-0/0 | R/W-0/0 | R/W-0/0 | R/W-0/0 | R/W-0/0 | R/W-0/0 |
|---|---|---|---|---|---|---|---|
| — | — | BANK5 | BANK4 | BANK3 | BANK2 | BANK1 | BANK0 |
| BIT 7 | | | | | | | BIT 0 |

BIT 7-6   UNIMPLEMENTED: READ AS '0'
BIT 5-0   BANK<5:>: BANK SELECTION VALUE BITS

| MNEMONIC, OPERANDS | DESCRIPTION | | CYCLES | 16-BIT INSTRUCTION WORD | | STATUS AFFECTED |
|---|---|---|---|---|---|---|
| | | | | MSb | LSb | |
| MOVFF $f_s, f_d$ | MOVE $f_s$ (SOURCE) TO $f_d$ (DESTINATION) | 1st WORD 2nd WORD | 2 | 1100 ffff ffff 1111 ffff ffff | ffff ffff ffff ffff | NONE |
| MOVFFL $f_s, f_d$ | MOVE $f_s$ (SOURCE) TO g (FULL DESTINATION) $f_d$ (FULL DESTINATION) | 1st WORD 2nd WORD 3rd WORD | 3 | 0000 0000 0110 1111 ffff ffff 1111 gggg gggg | ffff ffgg gggg | NONE |

FIG. 6a

| MNEMONIC, OPERANDS | DESCRIPTION | | CYCLES | 16-BIT INSTRUCTION WORD | | STATUS AFFECTED |
|---|---|---|---|---|---|---|
| | | | | MSb | LSb | |
| MOVSF $z_s, f_d$ | MOVE $z_s$ (SOURCE) TO $f_d$ (DESTINATION) | 1st WORD 2nd WORD | 2 | 1110 1011 0zzz 1111 ffff ffff | zzzz ffff | NONE |
| MOVSFL $z_s, f_d$ | OPCODE MOVE $z_s$ (SOURCE) TO $f_d$ (DESTINATION) | 1st WORD 2nd WORD 3rd WORD | 3 | 0000 0000 0000 1111 xxxz zzzz 1111 ffff ffff | 0010 zzff ffff | NONE |

FIG. 6b

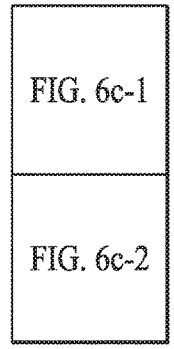

FIG. 6c

BYTE-ORIENTED FILE REGISTER OPERATIONS  EXAMPLE INSTRUCTION

| 15 | 10 | 9 | 8 | 7 | 0 |
|---|---|---|---|---|---|
| OPCODE | | d | a | f (FILE #) | |

ADDWF MYREG, W, B d = 0 FOR RESULT DESTINATION TO BE WREG REGISTER
d = 1 FOR RESULT DESTINATION TO BE FILE REGISTER (f)
a = 0 TO FORCE ACCESS BANK
a = 1 FOR BSR TO SELECT BANK
f = 8-BIT FILE REGISTER ADDRESS

BYTE TO BYTE MOVE OPERATIONS (2-WORD)

| 15 | 12 | 11 | 0 |
|---|---|---|---|
| OPCODE | | f (SOURCE FILE #) | |
| 15 | 12 | 11 | 0 |
| 1111 | | f (DESTINATION FILE #) | |

MOVFF MYREG1, MYREG2 f = 12-BIT FILE REGISTER ADDRESS

BYTE TO BYTE MOVE OPERATIONS (3-WORD)

| 15 | 4 | 3 | 0 |
|---|---|---|---|
| OPCODE | | FILE # | |
| 15 | 12 | 11 | 0 |
| 1111 | | FILE # | |
| 15 | 12 | 11 | 0 |
| 1111 | | FILE # | |

MOVFFL MYREG1, MYREG2

FROM 6c-1

BIT-ORIENTED FILE REGISTER OPERATIONS

| 15 | 12 | 11 | 9 | 8 | 7 | 0 |
|---|---|---|---|---|---|---|
| OPCODE | | b (BIT #) | | a | f (FILE #) | |

BSF MYREG, BIT, B b = 3-BIT POSITION OF BIT IN FILE REGISTER (f)
a = 0 TO FORCE ACCESS BANK
a = 1 FOR BSR TO SELECT BANK
f = 8-BIT FILE REGISTER ADDRESS

LITERAL OPERATIONS

| 15 | 8 | 7 | 0 |
|---|---|---|---|
| OPCODE | | k (LITERAL) | |

MOVLW 7Fh k = 8-BIT IMMEDIATE VALUE

CONTROL OPERATIONS
CALL, GOTO AND BRANCH OPERATIONS

| 15 | 8 | 7 | 0 |
|---|---|---|---|
| OPCODE | | n<7:0> (LITERAL) | |

| 15 | 12 | 11 | 0 |
|---|---|---|---|
| 1111 | | n<19:8> (LITERAL) | |

GOTO LABEL n = 20-BIT IMMEDIATE VALUE

| 15 | 8 | 7 | 0 |
|---|---|---|---|
| OPCODE | S | n<7:0> (LITERAL) | |

| 15 | 12 | 11 | 0 |
|---|---|---|---|
| 1111 | | n<19:8> (LITERAL) | |

CALL MYFUNC

S = FAST BIT

| 15 | 11 | 10 | 0 |
|---|---|---|---|
| OPCODE | | n<10:0> (LITERAL) | |

BRA MYFUNC

| 15 | 8 | 7 | 0 |
|---|---|---|---|
| OPCODE | | n<7:0> (LITERAL) | |

BC MYFUNC

FIG. 6c-2

| BANK | BSR[5:0] | addr [7:0] | A | B | |
|---|---|---|---|---|---|
| BANK 0 | 00 0000 | 00h | ACCESS RAM | ACCESS RAM | |
| | | FFh | GPR | GPR | |
| BANK 1 | 00 0001 | 00h<br>FFh | | | |
| BANK 2 | 00 0010 | 00h<br>FFh | GPR | GPR | |
| BANK 3 | 00 0011 | 00h<br>FFh | | | |
| BANKS 4 TO 7 | 00 0100 — 00 0111 | 00h<br>•<br>•<br>FFh | UNIMPLEMENTED | GPR | |
| BANKS 8 TO 15 | 00 1000 — 00 1111 | 00h<br>•<br>•<br>FFh | | UNIMPLEMENTED | TO FIG. 9b |
| BANKS 16 TO 31 | 01 0000 — 01 1111 | 00h<br>•<br>•<br>FFh | UNIMPLEMENTED | UNIMPLEMENTED | |
| BANKS 32 TO 59 | 10 0000 — 11 1011 | 00h<br>•<br>•<br>FFh | UNIMPLEMENTED | UNIMPLEMENTED | |
| BANK 60 | 11 1100 | 00h | UNIMPLEMENTED[1] | UNIMPLEMENTED[1] | |
| | | FFh | SFR[1] | SFR[1] | |
| BANKS 61 TO 62 | 11 1101 — 11 1110 | 00h<br>•<br>•<br>FFh | SFR | SFR | |
| BANK 63 | 11 1111 | 00h<br>FFh | SFR | SFR | |

NOTE 1: DEPENDS ON THE NUMBER OF SFRs. REFER TABLE 3-19 AND TABLE 3-20

FIG. 9a

MICROCONTROLLER WITH VARIABLE LENGTH MOVE INSTRUCTIONS USING DIRECT IMMEDIATE ADDRESSING OR INDIRECT REGISTER OFFSET ADDRESSING

RELATED PATENT APPLICATION

This application claims priority to commonly owned U.S. Provisional Patent Application No. 62/335,446; filed May 12, 2016; which is hereby incorporated by reference herein for all purposes.

TECHNICAL FIELD

The present disclosure relates to microprocessors and microcontrollers.

BACKGROUND

Microcontrollers are systems on a chip that comprise a microprocessor, memory, and a plurality of integrated peripheral devices. A wide variety of microcontrollers such as 8-bit, 16-bit, and 32-bit microcontrollers are available. While the 16-bit and 32-bit microcontrollers provide for large data memory, memories in the 8-bit microcontrollers are generally limited due to the architecture of the device. 8-bit microcontrollers are still very popular and used in many applications. To keep the cost low, certain 8-bit microcontrollers are designed with a very limited amount of data memory, for example not more than 4096 bits. The reason for such limitations lie in the instructions size and the limited addressing logic.

FIG. 1 shows a typical architecture of such a low cost 8-Bit microcontroller manufactured by the Assignee of the present application using a memory banking technology to reduce the complexity of the processor. As can be seen such a microcontroller is designed according to the Harvard architecture and allows for various addressing modes of the data memory. For example, the 16-bit instruction word is designed to carry up to 12 address bits that can address up to 4096 memory locations. If less than 12 bits are provided by an instruction due to a larger op-code, a memory banking mechanism is used. Then the respective bits of an instruction can be combined with 4 bits provided by a bank select register BSR. A plurality of indirect address register FSR can be provided which may each address the full memory space of the data memory and therefore these registers use 12 bits. An access bank can be used to temporarily switch to a predefined bank based on a specific bit setting in the instruction. The predefined memory bank can be, e.g., memory-mapped to the most important special function registers. Thus changes in these registers can be performed independent of which memory bank is currently selected with a minimum of delay. Thus, even with a 16-bit instruction word length, an 8-bit microcontroller is limited in the amount of data memory that can be reasonably supported by the architecture.

SUMMARY

However, these type of 8-bit microcontrollers are often equipped with many peripheral devices in particular as newer more powerful peripheral devices are developed, existing designs are enhanced with additional peripheral devices. Often such enhanced microcontrollers do not provide for enough data memory. Hence, there exist a need for an improved enhanced microcontroller capable of using a larger data memory without increasing the instruction word length.

According to various embodiments, a microcontroller having an 8-bit architecture with a limited address space for data memory can be enhanced to provide more data memory.

According to an embodiment, an 8-bit microprocessor may comprise a program memory having a 16-bit instruction word size and a data memory having an 8-bit data size wherein an instruction word has a payload size for an address of up to 12 bits; a central processing unit coupled with the program memory and the data memory; a bank select register configured to select one of up to 64 memory banks; and an indirect addressing register operable to address up to 16 KB of data memory; wherein the CPU is configured to execute a first move instruction comprising two instruction words and configured to only access the lower 4 KB of the data memory and a second move instruction comprising three instruction words and configured to access the entire data memory.

According to a further embodiment, the bank select register may comprise 6 bits. According to a further embodiment, each indirect address register may comprise 14 bits. According to a further embodiment, each instruction word may comprise an op-code portion. According to a further embodiment, a first instruction word of the first move instruction may comprise a 12 bit source address and a second instruction word of the first move instruction may comprise a 12 bit destination address thereby limiting access to the lower 4 k of the data memory. According to a further embodiment, a first instruction word of the second move instruction may comprise 4 bits of a source address and a second instruction word of the second move instruction may comprise 10 bits of the source address and 2 bits of the destination address and a third instruction word of the second move instruction may comprise 12 bits of the destination address. According to a further embodiment, the CPU can further be configured to execute a third move instruction comprising two instruction words, wherein a first instruction word of the third move instruction comprises a 7-bit literal offset to a 14-bit indirect address stored in an indirect address register and a second instruction word of the third move instruction comprises a 12-bit destination address which is configured to access only the lower 4K of the data memory. According to a further embodiment, the CPU can further be configured to execute a fourth move instruction comprising three instruction words, wherein the first instruction word comprises only op-code, wherein a second instruction word of the fourth move instruction comprises a 7-bit literal offset to a 14-bit indirect address stored in an indirect address register and 2 bits of the destination address and the third instruction word comprises remaining 12-bit of the destination address. According to a further embodiment, a bit in an instruction word may determine whether a memory bank as defined in the bank select register is accessed or whether a virtual memory bank combining data memory space of two memory banks is selected. According to a further embodiment, the 8-bit microprocessor may further comprise a hardware multiplier and associated hardware multiplier registers and at least one set of shadow registers configured to automatically save a context when an exception occurs, wherein the context is formed by a working register, the bank select register, a status register, indirect address registers, the hardware multiplier registers and a program latch register. According to a further embodiment, a bit in a context control register may select between a first set of context registers and the shadow registers. According to a further embodiment, a reduced context can automatically be saved in a second set of shadow registers encompassing less registers than said first set of context register when a call instruction is executed, wherein the reduced context is formed by a working register, the bank select register, and a status register.

According to another embodiment, a method for operating an 8-bit microprocessor, may comprise providing a program memory having a 16-bit instruction word size and a data memory having an 8-bit data size, wherein an instruction word has a payload size for an address of up to 12 bits; providing a central processing unit coupled with the program memory and the data memory; providing a bank select register configured to select one of up to 64 memory banks; providing an indirect addressing register operable to address up to 16 KB of data memory; executing a first move instruction comprising two instruction words and configured to only access the lower 4 KB of the data memory; and executing a second move instruction comprising three instruction words and configured to access the entire data memory.

According to a further embodiment of the method, the bank select register may comprise 6 bits. According to a further embodiment of the method, each indirect address register may comprise 14 bits. According to a further embodiment of the method, each instruction word may comprise an op-code portion. According to a further embodiment of the method, a first instruction word of the first move instruction may comprise a 12 bit source address and a second instruction word of the first move instruction may comprise a 12 bit destination address thereby limiting access to the lower 4k of the data memory. According to a further embodiment of the method, a first instruction word of the second move instruction may comprise 4 bits of a source address and a second instruction word of the second move instruction may comprise 10 bits of the source address and 2 bits of the destination address and a third instruction word of the second move instruction may comprise 12 bits of the destination address. According to a further embodiment of the method, the method may further comprise: executing a third move instruction comprising two instruction words, wherein a first instruction word of the third move instruction comprises a 7-bit literal offset to a 14-bit indirect address stored in an indirect address register and a second instruction word of the third move instruction comprises a 12-bit destination address which is configured to access only the lower 4K of the data memory. According to a further embodiment of the method, the method may further comprise executing a fourth move instruction comprising three instruction words, wherein the first instruction word comprises only op-code, wherein a second instruction word of the fourth move instruction comprises a 7-bit literal offset to a 14-bit indirect address stored in an indirect address register and 2 bits of the destination address and the third instruction word comprises remaining 12-bit of the destination address. According to a further embodiment of the method, a bit in an instruction word may determine whether a memory bank as defined in the bank select register is accessed or whether a virtual memory bank combining data memory space of two memory banks is selected. According to a further embodiment of the method, the method may further comprise providing a hardware multiplier and associated hardware multiplier registers and at least one set of shadow registers, the method further comprises when an exception occurs saving a context, wherein the context is formed by a working register, the bank select register, a status register, indirect address registers, the hardware multiplier registers and a program latch register. According to a further embodiment of the method, a bit in a context control register may select between a first set of context registers and the shadow registers. According to a further embodiment of the method, a reduced context can automatically be saved in a second set of shadow registers encompassing less registers than said first set of context register when a call instruction is executed, wherein the reduced context is formed by a working register, the bank select register, and a status register.

BRIEF DESCRIPTION OF THE DRAWINGS

FIG. 1a shows a conventional PIC18 architecture;

FIG. 1b shows an enhanced PIC18 architecture according to various embodiments;

FIGS. 6a and 6b shows the instructions MOVFF, MOVFFL, MOVSF and MOVSFL.

FIGS. 6c, 6c-1, and 6c-2 shows the general format for instructions according to various embodiments.

FIGS. 7a-1-7a-2, 7b-1-7b-2, 7c-1-7c-2, and 7d-1-7d-2 show timing diagrams for the instructions of FIGS. 6a and 6b.

FIGS. 9a-9b show examples of a data memory bank memory map for various devices according to the disclosed embodiments.

DETAILED DESCRIPTION

Figures 1, 1A:
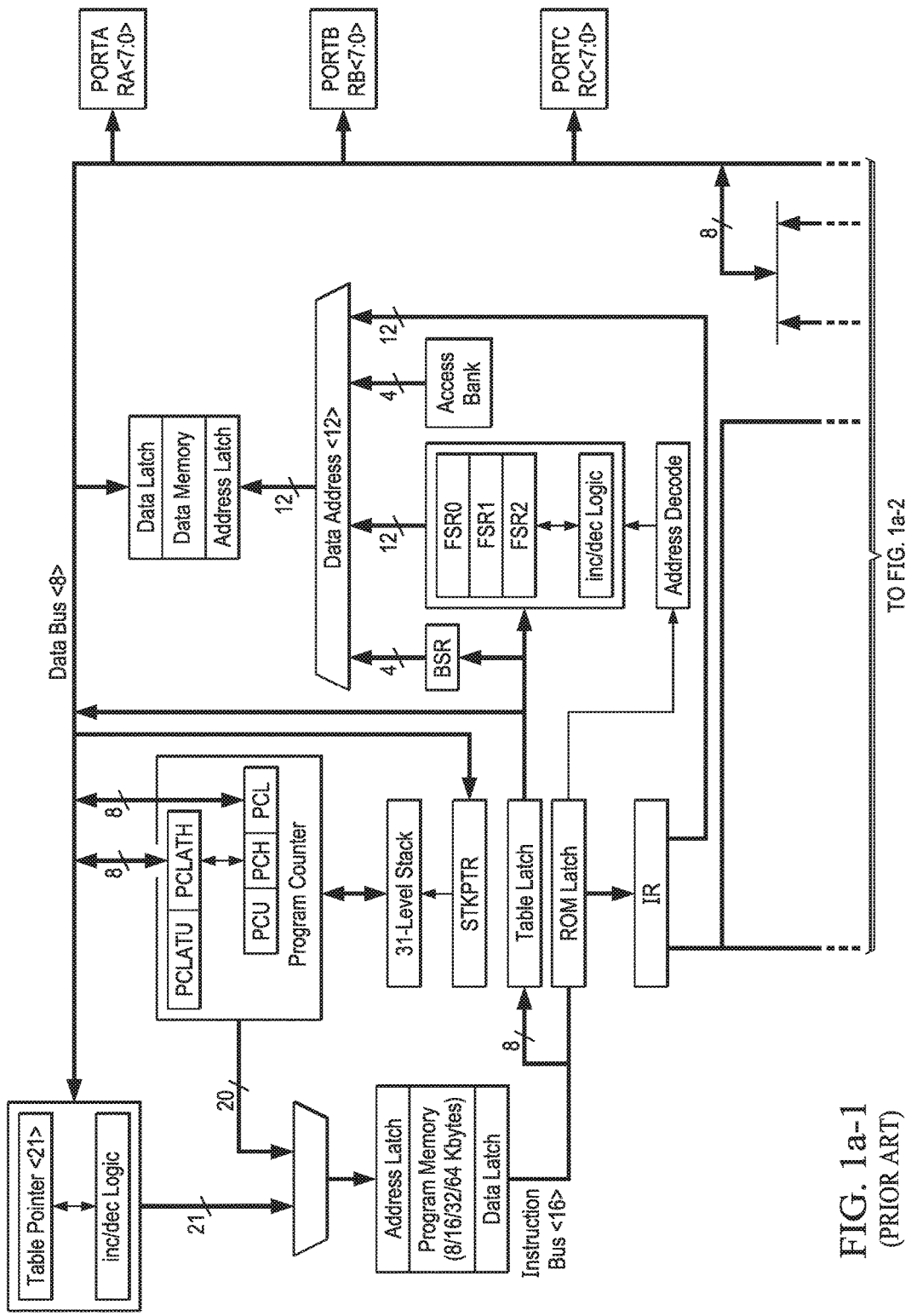
Figures 1, 1A, 2:
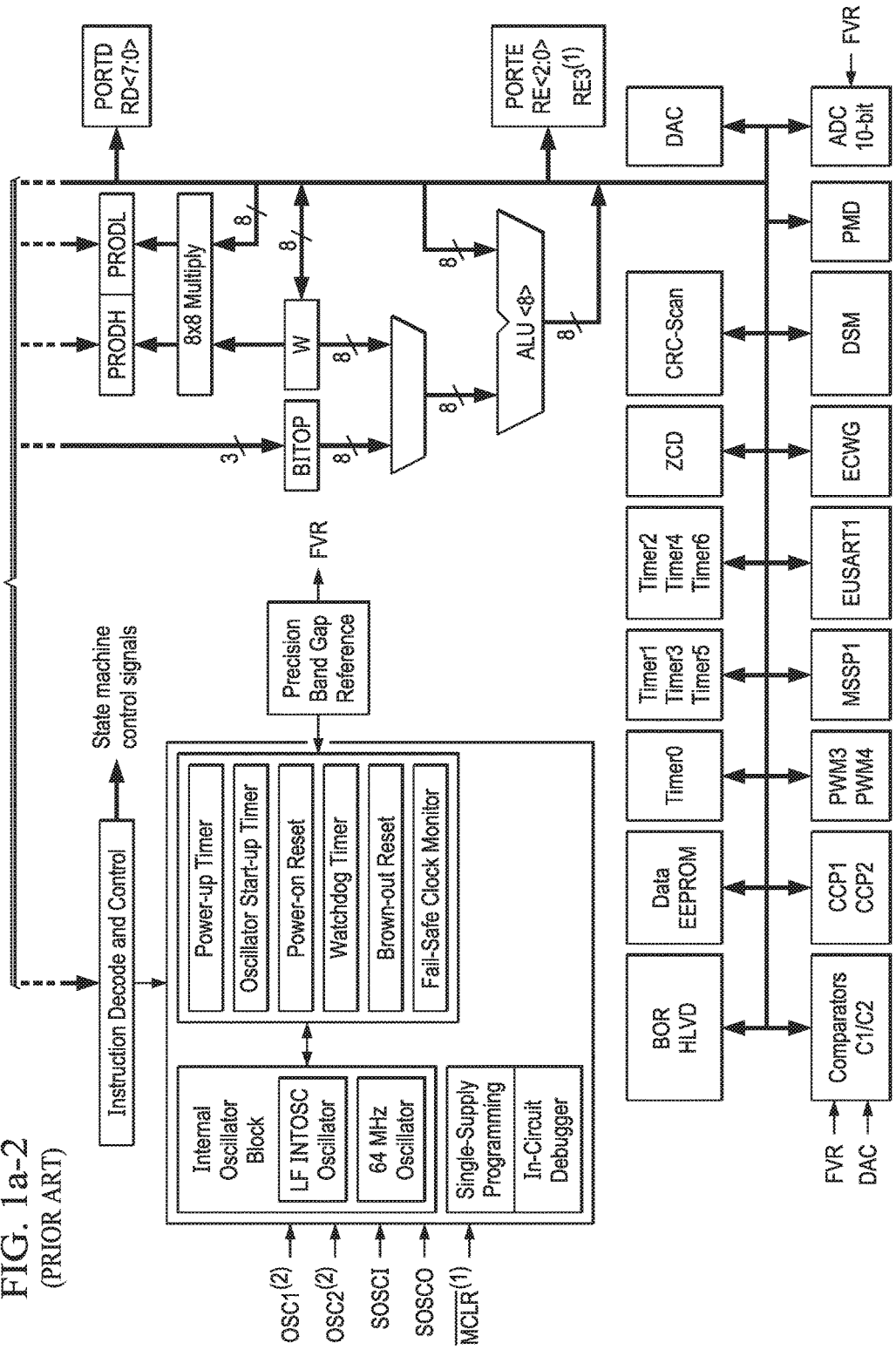
Figures 1, 1B:
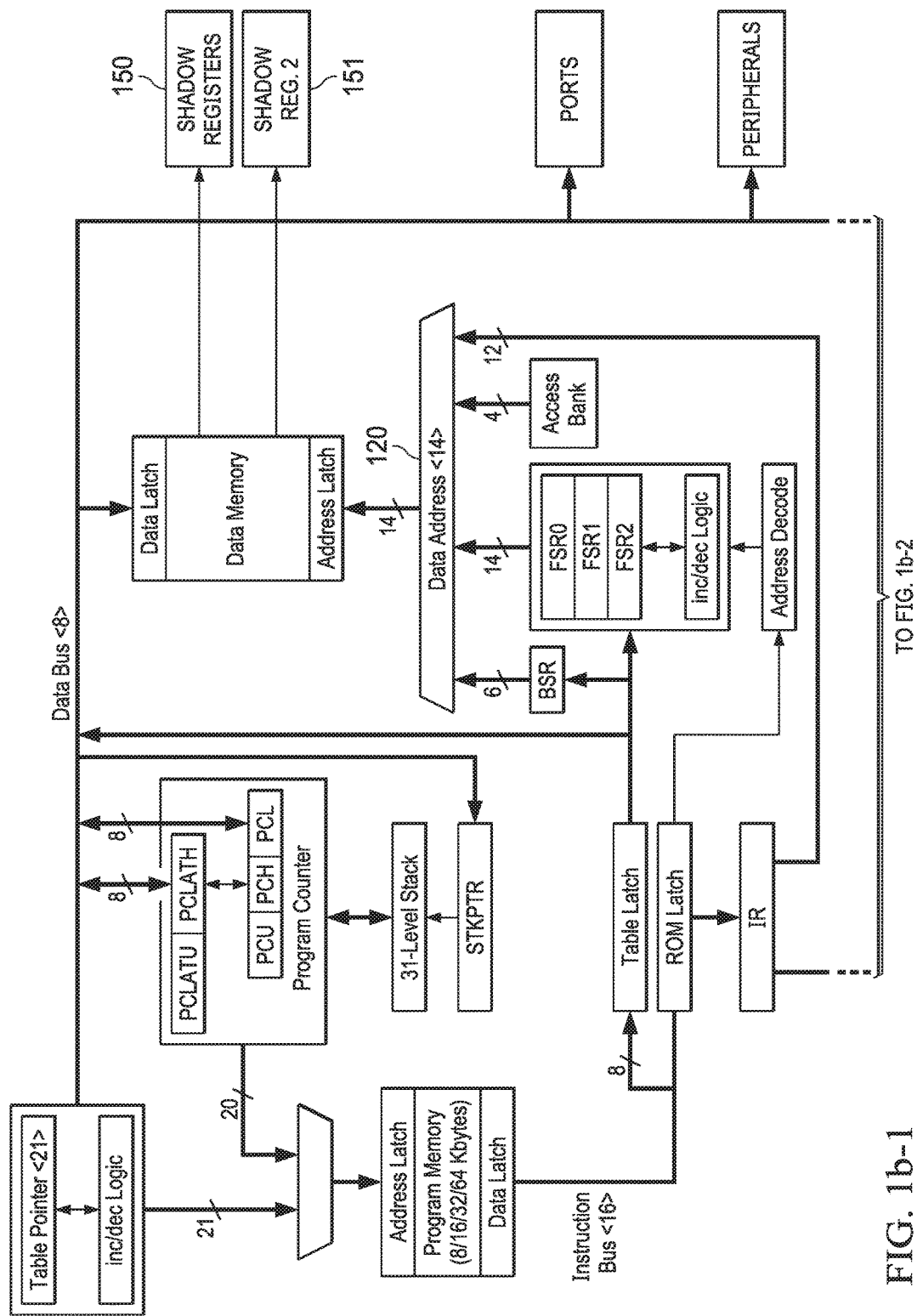
Figures 1, 1B, 2:
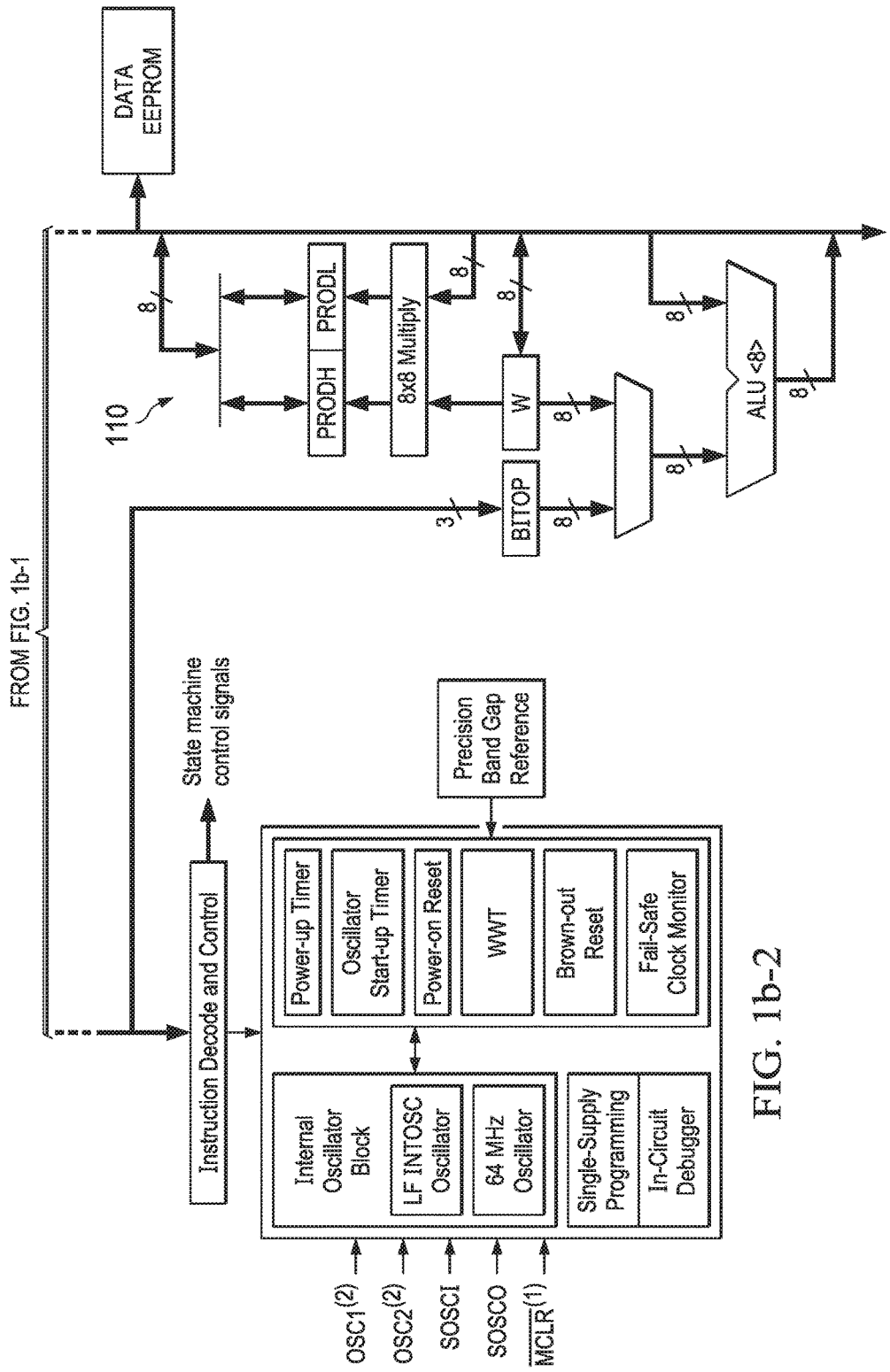

An improved 8-bit CPU as shown in FIG. 1b provides for additional instructions and features to use a bigger data memory without enlarging the instruction word length.

As mentioned above, in particular with the increasing size of FLASH on microcontrollers (in general), the need for increasing the RAM content has grown with it. However, this cannot be done easily in certain existing architectures such as the PIC architecture. For example, certain popular microcontrollers such as the PIC18 family of microcontrollers manufactured by the assignee of the present application are limited to a total data space size of 4 KB. This includes both RAM and SFRs (Special Function Registers). Current FLASH/RAM ratios on these type of products is 16:1. 64 KB program memory PIC18's are about 10% light on RAM. 128 KB program memory PIC18's are about 55% light on RAM. As more peripherals are added to these devices, these deficits will increase.

According to various embodiments, an upgraded enhanced 8-bit microcontroller architecture as shown in FIG. 1b using a 16-bit instruction word size can be provided that allows for a larger data memory space, for example 16 KB of data memory that requires 14 addressing bits.

The various embodiments allow to use an existing 8-bit CPU with an established customer/user base to meet data/RAM space requirements. In other words by not increasing the instruction word length, the same instruction structure is used providing a high degree of backwards compatibility.

Generally, the 8-bit architecture using 16-bit word program instructions accesses the data memory through a bank select register. Thus, most single word instructions are limited to a selected memory bank. The single instruction word has enough bits to provide for an adequate address within a selected memory bank. In addition, a forced bank mechanism is provided to allow access to important special function registers. This forced bank access switches to a virtual bank as will be discussed in more detail below when a specific bit in the instruction word is set.

Indirect addressing is used to allow access to the entire memory space. Thus, a plurality of special function register sets, such as FSR0, FSR1, FSR2, as shown in FIG. 1b are provided each consisting of two concatenated 8-bit special function registers allowing to store a 14-bit address. Some of these register sets, for example FSR2, can be dedicated to perform access in combination with certain instructions as will be explained in more detail below.

According to various embodiments the following enhancements can be provided:

As shown in FIG. 1b, with respect to the bank select register BSR, the width of this register is changed from 4 bits to 6 bits which allows to select up to a total of 64 data memory banks. With this enhancement come new instruction such as for example the MOVLB instruction which is designed to have 6-bit payload. With respect to the indirect addressing registers FSR, the width of such a file select register (FSR) is changed from 12 bits to 14 bits as mentioned above. Each file select register FSR is formed by concatenation of two 8-bit special function registers. A new LFSR instruction now has a 14-bit payload.

FIG. 1b also shows the program counter including its latched portion PCLATU/PCLATH. The program counter is coupled with a 31 level stack addressed by a stack pointer STKPTR.

FIG. 1b furthermore shows that the data address multiplexer 120 generates an output address with 14 bits that is forwarded to the data memory 130. Depending on the instruction, the multiplexer assembles a 14 bit address from the up to 12 bit received from the instruction and the bank select register.

Moreover, according to various embodiments, the following modified move instructions are available: MOVFF and MOVSF. These instructions can now only access the lower half of GPR address space at least with respect to their destination address, in particular the lower 4k of the data address space, due to the fact that the address is limited to 12 bits for source and destination. The MOVSF instruction uses a dedicated indirect addressing register, for example FSR2, for providing the source address. The instruction further comprises a literal that is added to the content of FSR2. Thus, a limited address space from a point anywhere in the data memory can be used as the source address. The MOVFF instruction is limited to the lower 4K of the data memory for both source and destination address.

According to further embodiments, additional move instructions are provided. These additional instructions include the MOVFFL and MOVSFL instruction. These instructions are three word instructions which allow access to the entire address space. The address bits for source and destination in the MOVFFL instruction are distributed over the three instruction words for example such that a 14-bit address is partially encoded in two instruction words as will be explained in more detail below. The MOVSFL instruction is similar to the MOVSF instruction with respect to the source address but can provide a 14-bit destination address in the second and third instruction word and therefore use any address within the entire data memory space for the destination. Hence, the logic providing for the data memory address within the central processing unit is designed such that bits from two instruction words are concatenated to form a 14-bit address for the data memory for the source and/or destination address.

FIG. 1b further shows a hardware multiplier section 110 including two 8-bit registers PRODH and PRODL for storing a result of a multiplication.

In addition, shadow registers 151 as shown in FIG. 1b can be added according to some embodiments for MAIN and LEVEL1 contexts to save the following registers:
WREG
BSR
STATUS
FSR0/1/2
PRODH/L
PCLATH/U Thus, shadow registers 150 for the hardware multiplier (PRODH and PRODL), all the indirect addressing registers FSR and for the program counter latch registers can be provided and will be used when an interrupt or any other suitable exception occurs. The CPU automatically saves the current context stored in these registers when an interrupt or other suitable exception occurs. Thus, no software overhead is required for saving the content of these registers and a fast context switch is performed. Upon execution of a return from interrupt the context is restored automatically in similar fashion.

An additional subset of these shadow registers is shown with numeral 151 in FIG. 1b. This second set of shadow registers can be used for CALL instructions in addition to interrupt context shadow registers. The second show register set 151 comprises:
WREG
BSR
STATUS Thus, certain instructions, such as for example a call instruction or any other type of subroutine calling instruction, will also automatically save a current context with a reduced size, namely only consisting of the above mentioned three registers. With the exception of the number of registers a call instruction will automatically save the reduced context in similar fashion as described above with respect to an interrupt context switch.

All shadow registers 150 are memory mapped to the data RAM as indicated by the arrow in FIG. 1b. Thus, these registers are all readable and writable by the user. According to an implementation, a dedicated bit in a context control register selects between a MAIN context and a LEVEL1 context as available in the shadow registers 150. Other implementation may provide for more levels and therefore for additional register sets. Thus according to some embodiments, more than one set of shadow registers 150 and 151, respectively can be provided.

FIG. 2 shows the modified bank select register which now includes 6 bits. Thus, the MOVLB which modifies the content of the bank select register has been modified to support a 6 bit payload to select a data memory bank. The load indirect addressing instructions LFSR have been modified accordingly to allow the loading of a 14 bit address.

Figures 2, 3:
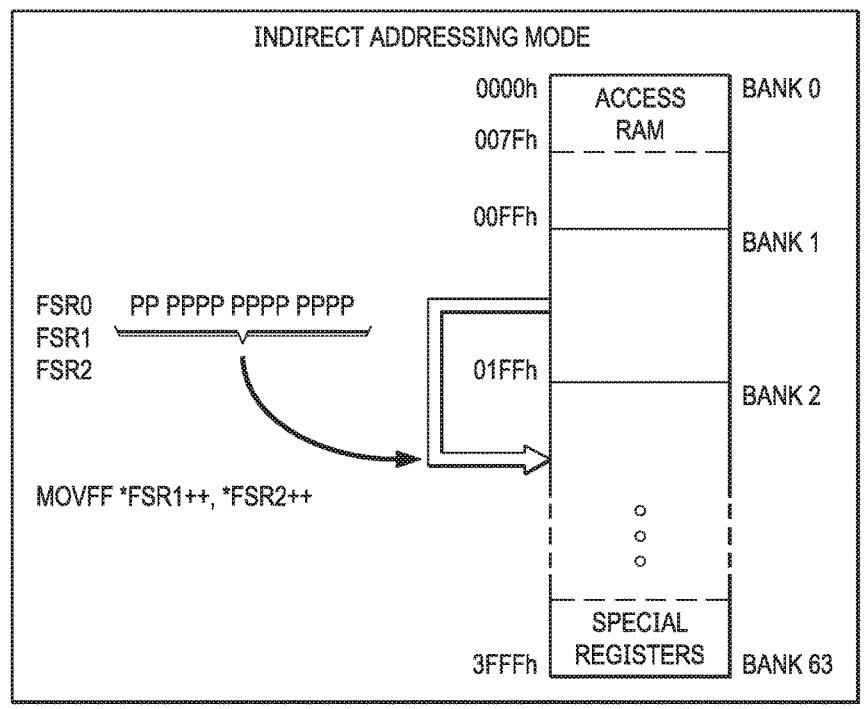
FIG. 2 shows the structure of the bank select register according to various embodiments
FIG. 3 shows the expanded indirect addressing mode using registers FSRx and their layout.

FIG. 3 shows the expanded indirect addressing mode. The registers FSRx now provide for a 14 bit address which allows to access any memory location within the expanded RAM.

Figure 4:
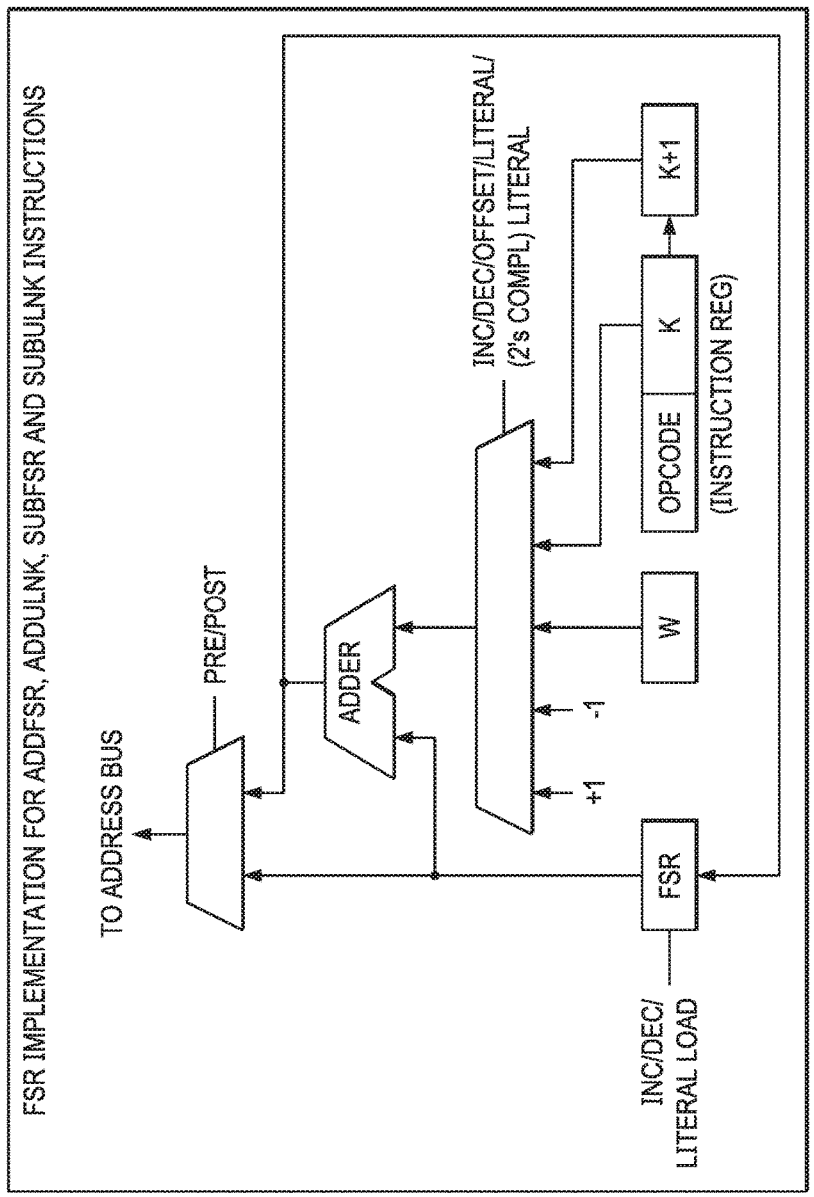
FIG. 4 shows the implementation of the logic for the FSRx implementation to be used for example with the instructions ADDFSR, ADDULNK, SUBFSR and SUBULNK.

FIG. 4 shows the implementation of the logic for the FSRx implementation to be used for example with the instructions ADDFSR, ADDULNK, SUBFSR and SUBULNK. As can be seen, the FSR register can be modified by adding either +1, −1, the working register, the literal from an opcode or 2's complement of the literal of an opcode. The adder generates a 14 bit address that can be stored directly in the FSRx registers.

Figure 5A:
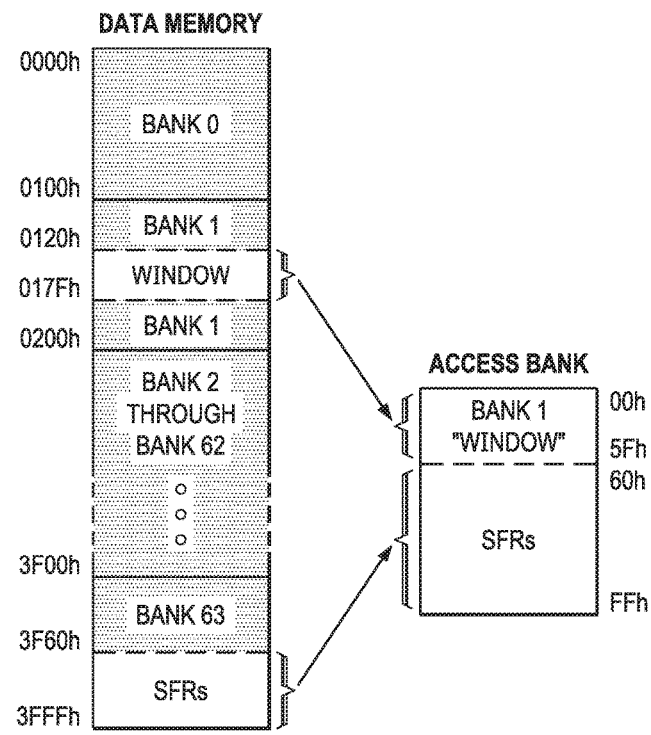
FIGS. 5a and 5b shows the indexed with literal offset addressing mode.

Under the proper conditions, certain instructions that use the access bank—that is, most bit-oriented and byte-oriented instructions—can invoke a form of indexed addressing using an offset specified in the instruction. This special addressing mode is known as Indexed Addressing with Literal Offset, or Indexed Literal Offset mode. When using the extended instruction set, this addressing mode requires the following: The use of the Access Bank is forced ('a'=0) and the file address argument is less than or equal to 5Fh. Under these conditions, as shown in FIG. 5a, the file address of the instruction is not interpreted as the lower byte of an address (used with the BSR in direct addressing), or as an 8-bit address in the Access Bank. Instead, the value is interpreted as an offset value to an Address Pointer, specified by an indirect address register FSR, e.g., FSR2. The offset and the contents of this indirect address register FSR2 are added to obtain the target address of the operation. The use of indexed literal offset addressing mode effectively changes how the first 96 locations of Access RAM (00h to 5Fh) are mapped as shown in FIG. 5a. Rather than containing just the contents of the bottom section of Bank 0, this mode maps the contents from a user defined "window" that can be located anywhere in the data memory space. The 14 bit value of an indirect addressing register, for example the FSR2 register, establishes the lower boundary of the addresses mapped into the window, while the upper boundary is defined by FSR2 plus 95 (5Fh). Addresses in the Access RAM above 5Fh are mapped as previously described. An example of access bank remapping in this addressing mode is shown in FIG. 5a. Remapping of the Access Bank applies only to operations using the Indexed Literal Offset mode. Operations that use the BSR (Access RAM bit is '1') will continue to use direct addressing as before.

Figure 5B:
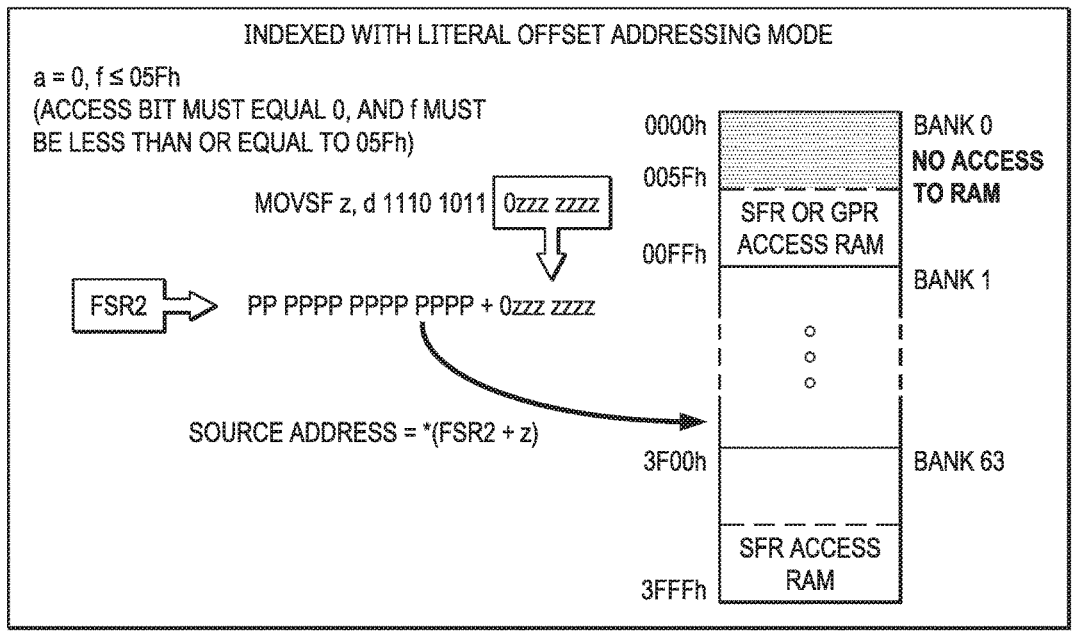

FIG. 5b show the indexed with literal offset addressing mode, when used with the MOVESF instruction which has two parameters z and d. Here the instruction uses one of the indirect addressing registers FSR, e.g. FSR2, to define a 14-bit base address which can be anywhere within the data memory and the instruction provides for literal offset value z which has 7 bits. Thus, when using indirect addressing, the resulting source address uses the FSR register as an indirect addressing register to which the literal z is added. The destination can be defined in a second instruction word for the MOVSF instruction which is limited to the lower 4 k data memory. For the MOVSFL instruction the first instruction word is entirely used for the opcode, the second instruction word provides for the literal offset value z and for two bits of the destination address. The third instruction word of the MOVSFL instruction provides for the remaining 12 bits of the destination address.

FIG. 6a shows an exemplary coding of the MOVFF instruction which is limited to a source address of 12 bits and a destination address of 12 bits in a two word instruction. Each instruction word has a 4 bit opcode and a 12 bit address. The opcode '1111' indicates that the instruction is a second or third instruction word in all multiple instruction word instructions. To be able to access the entire RAM, the new MOVFFL instruction is provided which has three words as shown in FIG. 6a, wherein the first word has a 12 bit opcode and 4 bits of source address f, the second word has 4 bit opcode, 10 bits of source address f, and 2 bits of the destination address g and the third word has 4 bit opcode and 12 bits of the destination address g. Thus, 14 bits are available for each the source address f and the destination address g to address the entire RAM.

FIG. 6b shows an exemplary coding of the modified MOVSF instruction and the new MOVSFL instruction. MOVSF has 7 bits for the literal offset value z and 12 bits for the destination address f. For the new three word instruction MOVSFL, the first word if the instruction is used entirely for the opcode. The second word uses four bits for the opcode, 7 bits to define the literal offset value z and 2 bits to define the MSB of destination address f. The remaining 12 bits of destination address f are then stored in the third word. Thus, the destination address f can be anywhere in the entire data memory address. However, the respective bits for source and destination can also be arranged differently within the three instruction words.

Thus, the range of the MOVSF instruction is limited to lower 4K of the data memory as mentioned above. The new instruction MOVSFL is added as a 3 word instruction and not limited with respect to the data memory and both are part of extended instruction set.

Thus, additional instructions can be provided to directly move data within the entire data memory, wherein some instructions limit the source address and/or the destination address. By using three instructions words wherein each instruction word comprises an opcode, up to 14 bits can be provided for the source as well as the destination. To allow this, encoding of the addresses is accomplished by splitting the addresses for the source over two respective instruction words of a multiple word instruction.

FIGS. 6c, 6c1, and 6c2 show the general format of instructions, in particular two and three word instructions and their specific content. As shown, second and third instruction words are designated by a specific four bit op-code "1111" followed by the payload of 12 bits. Thus, up to 12 bits can be provided by each additional instruction word.

Figure 7A:
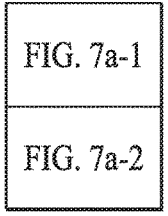
Figure 7B:
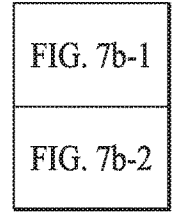
Figure 7C:
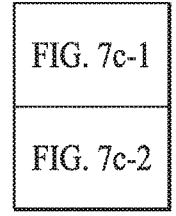
Figure 7D:
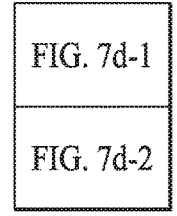
Figures 1, 7A:
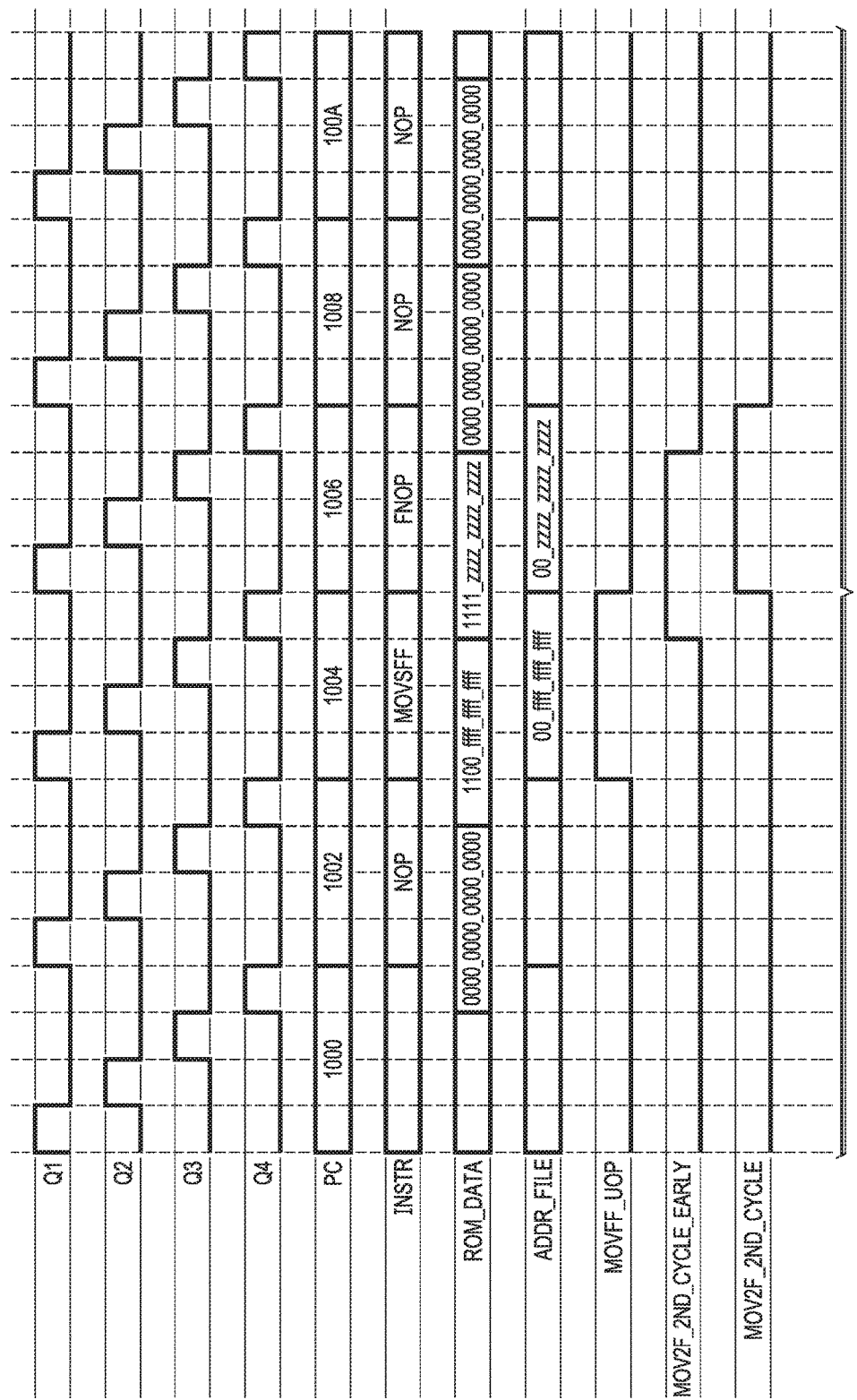
Figures 2, 7A:
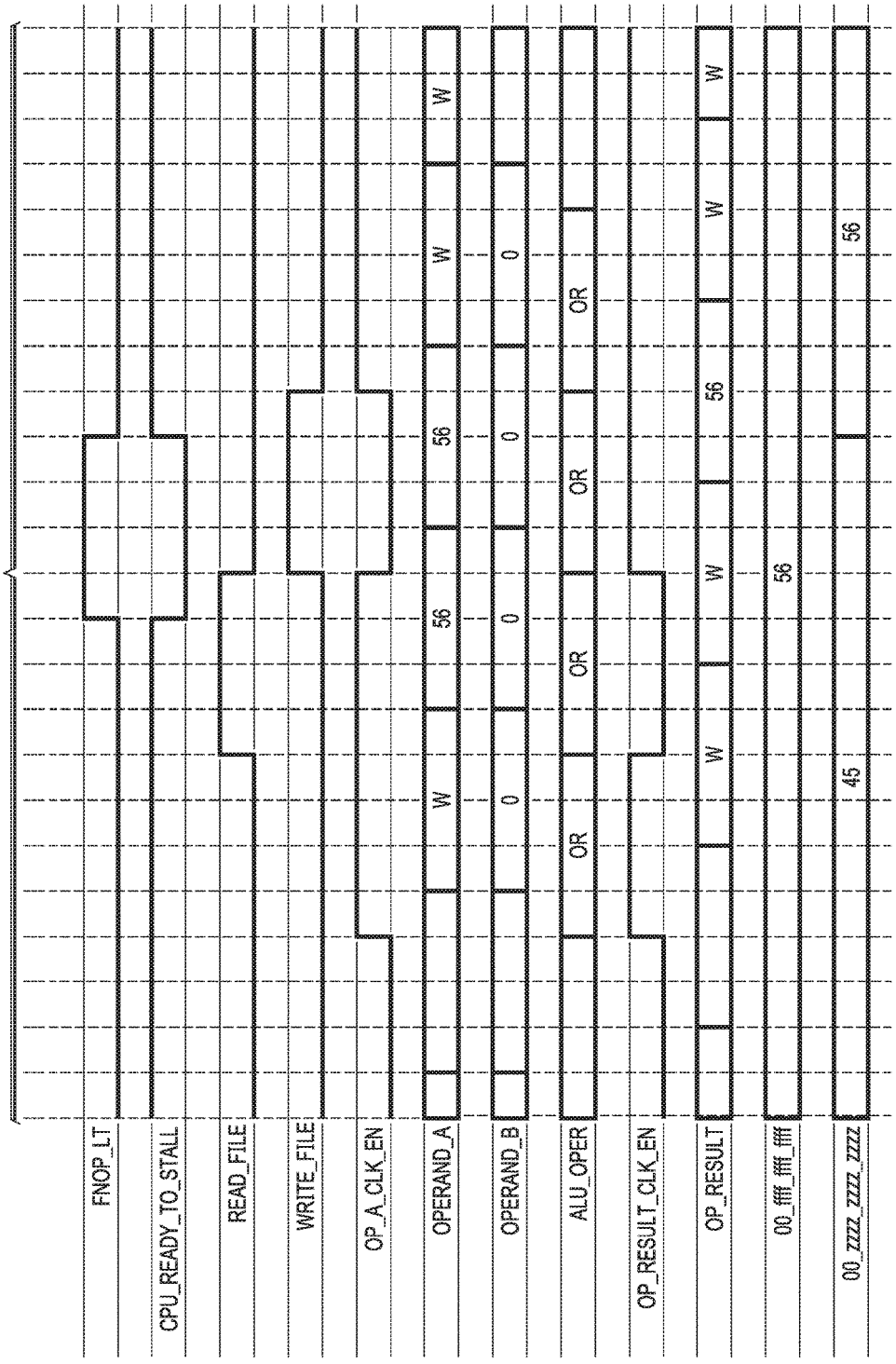
Figures 1, 7B:
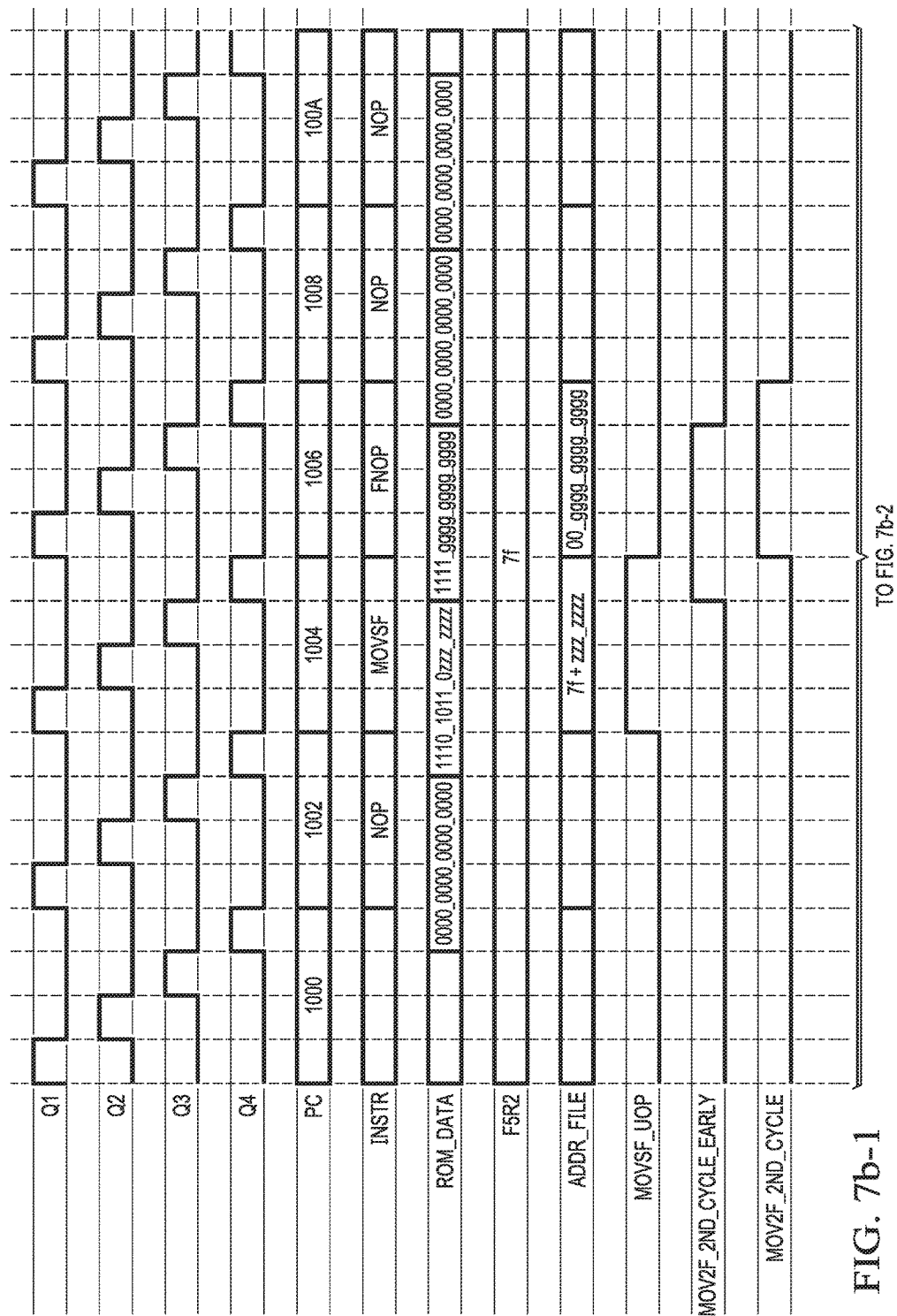
Figures 2, 7B:
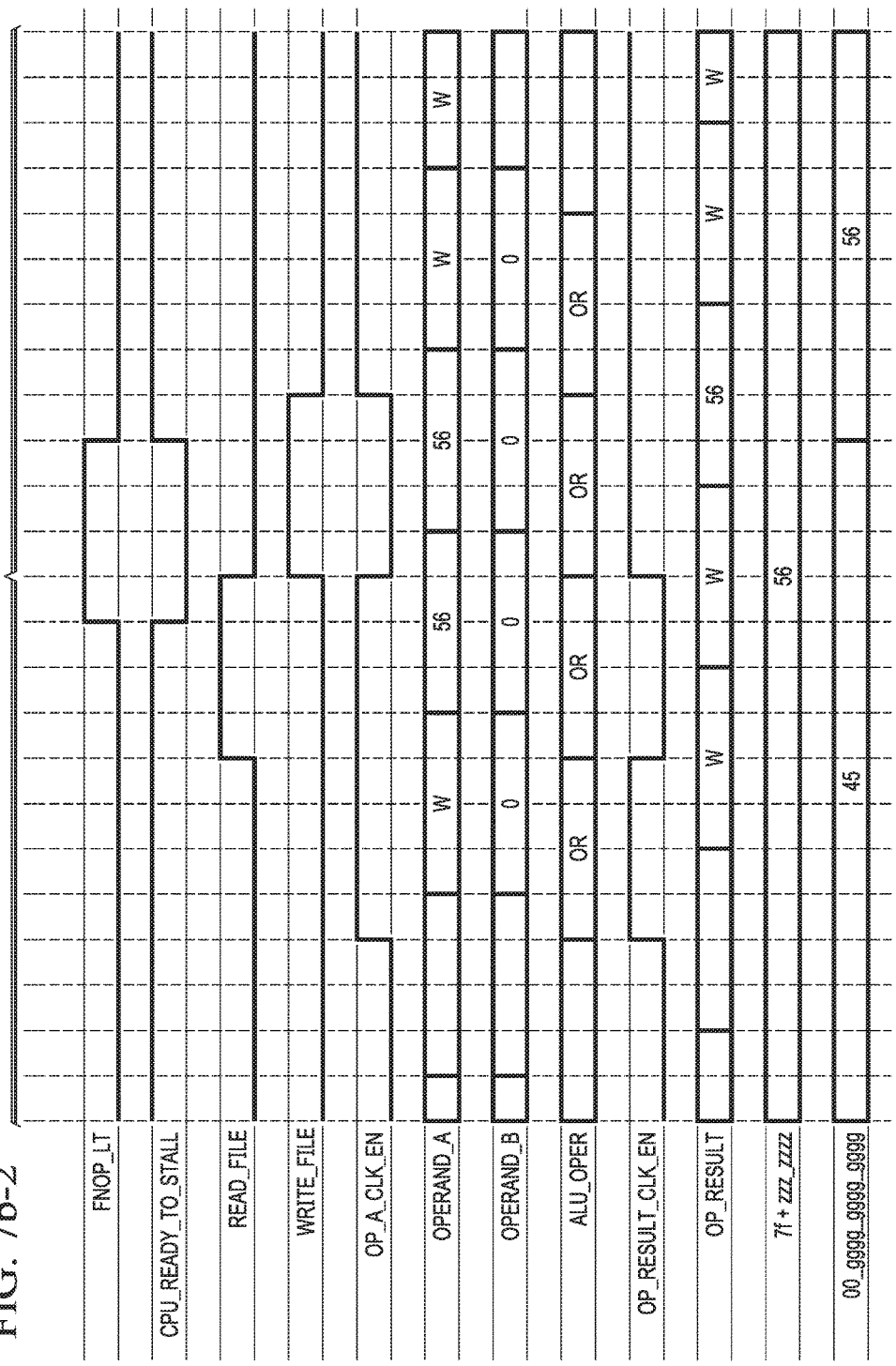
Figures 1, 7C:
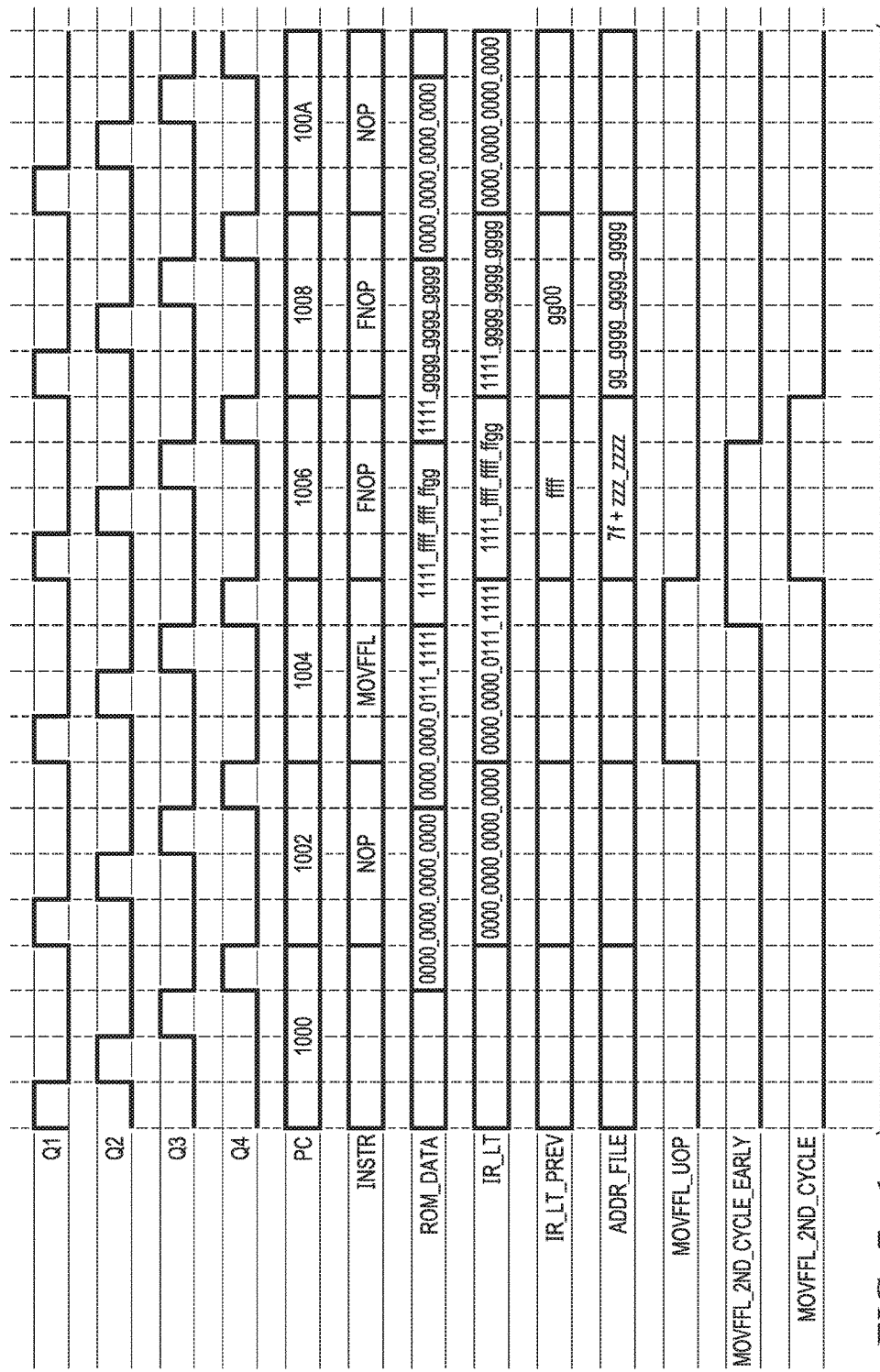
Figures 2, 7C:
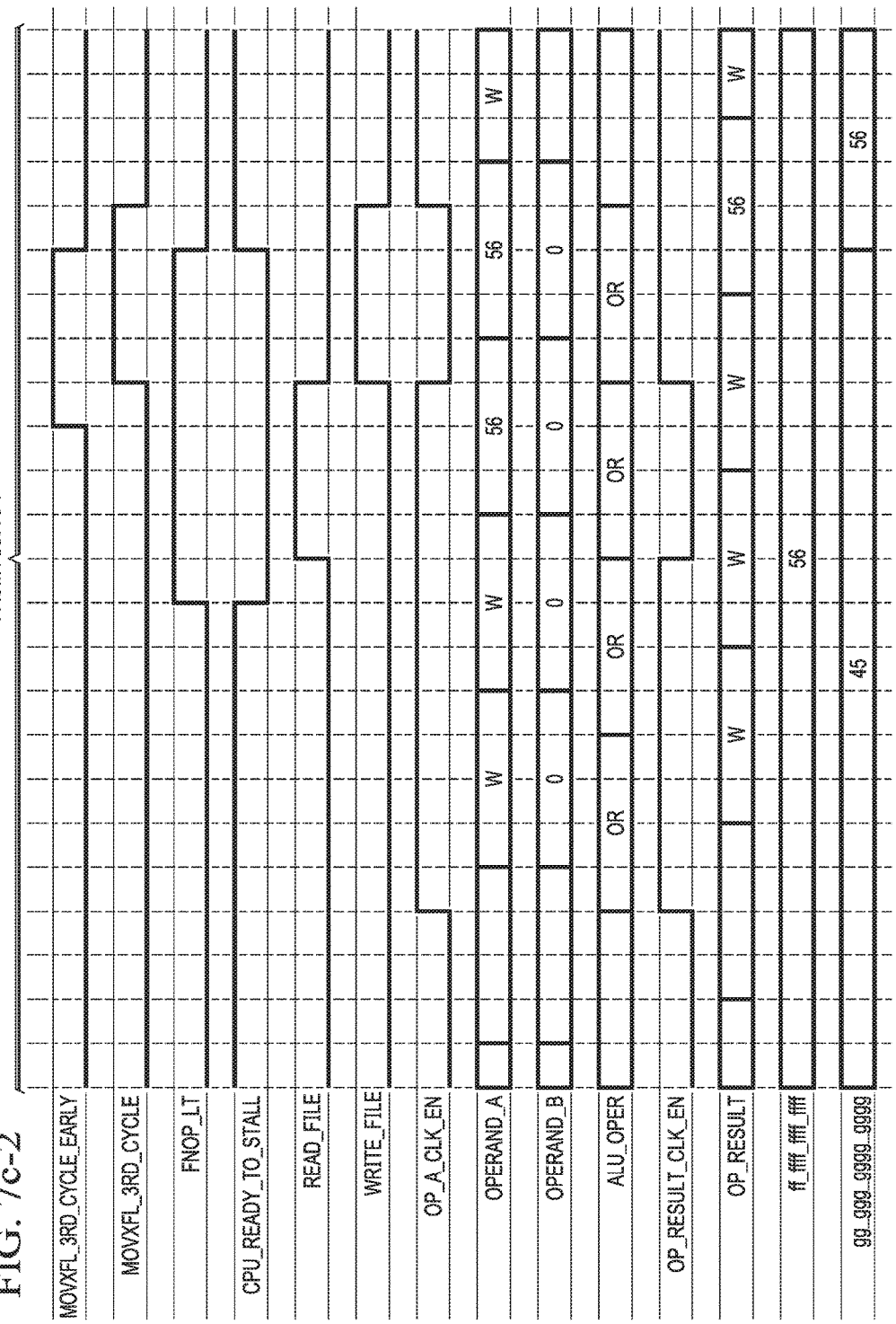
Figures 1, 7D:
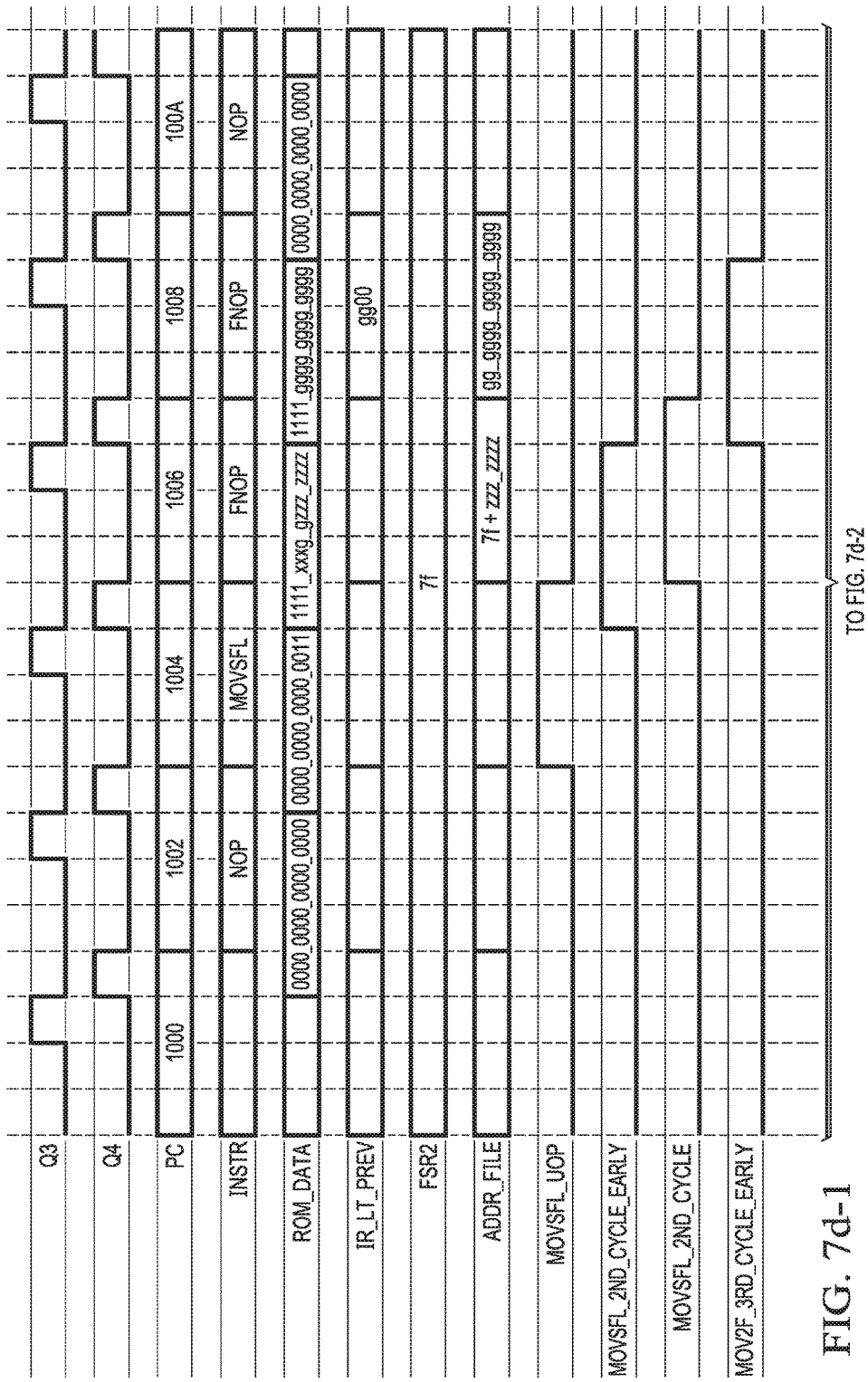
Figures 2, 7D:
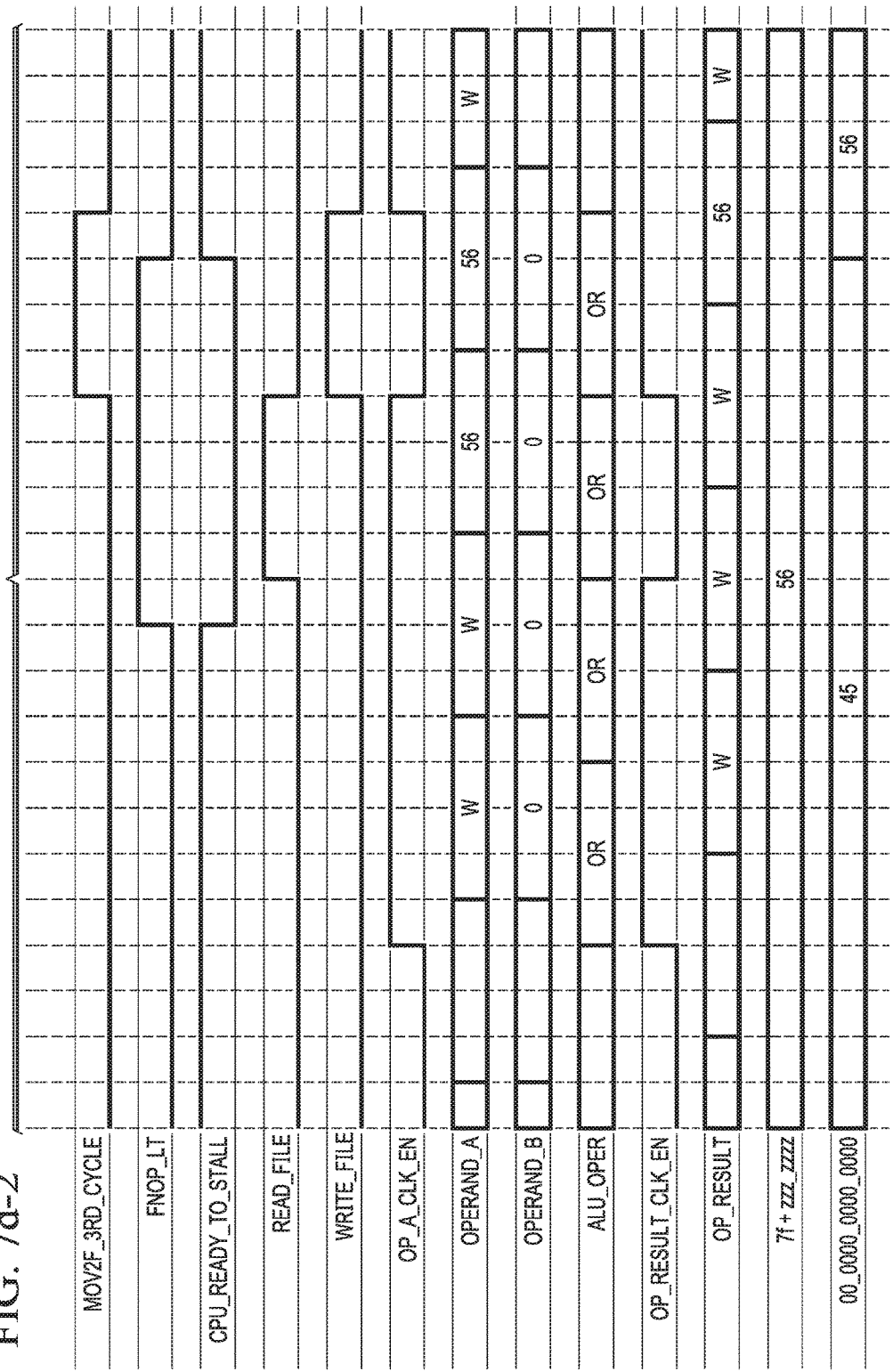

FIGS. 7a-1-7a-2 show timing of various signals within the CPU when the instruction MOVFF is executed. FIGS. 7b-1-7b-2 show timing of various signals within the CPU when the instruction MOVSF is executed. FIGS. 7c-1-7c-2 show timing of various signals within the CPU when the instruction MOVFFL is executed. FIGS. 7d-1-7d-2 show timing of various signals within the CPU when the instruction MOVSFL is executed.

Figure 8A:
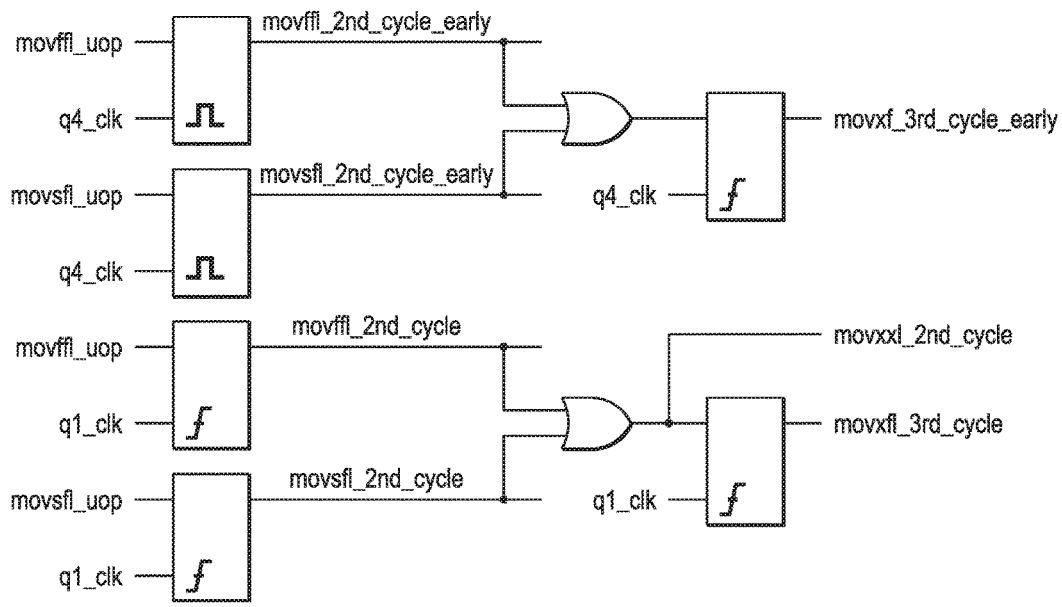
FIGS. 8a-8h show logic circuits for various logic signals within the CPU to handle the instructions of FIGS. 6a and 6b.
Figure 8B:
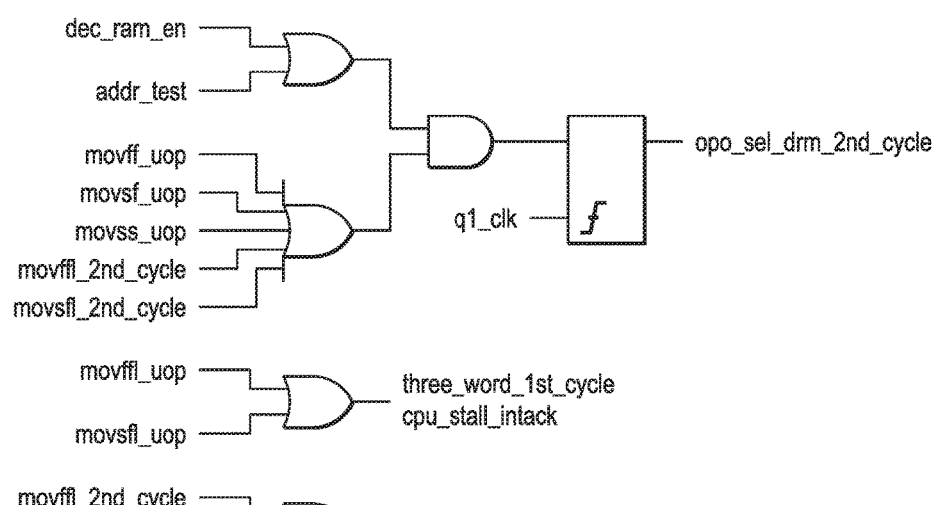
Figure 8C:
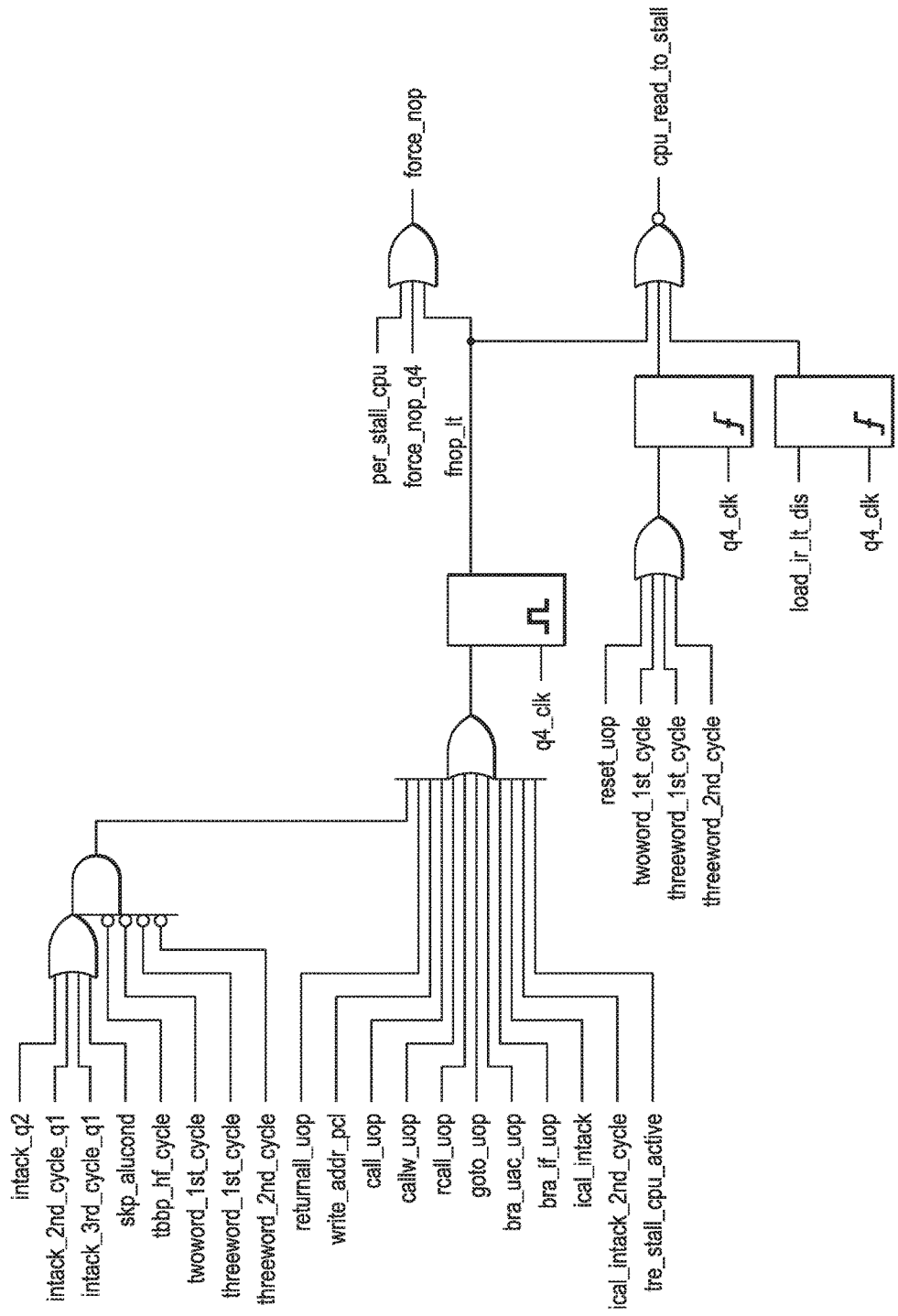
Figure 8D:
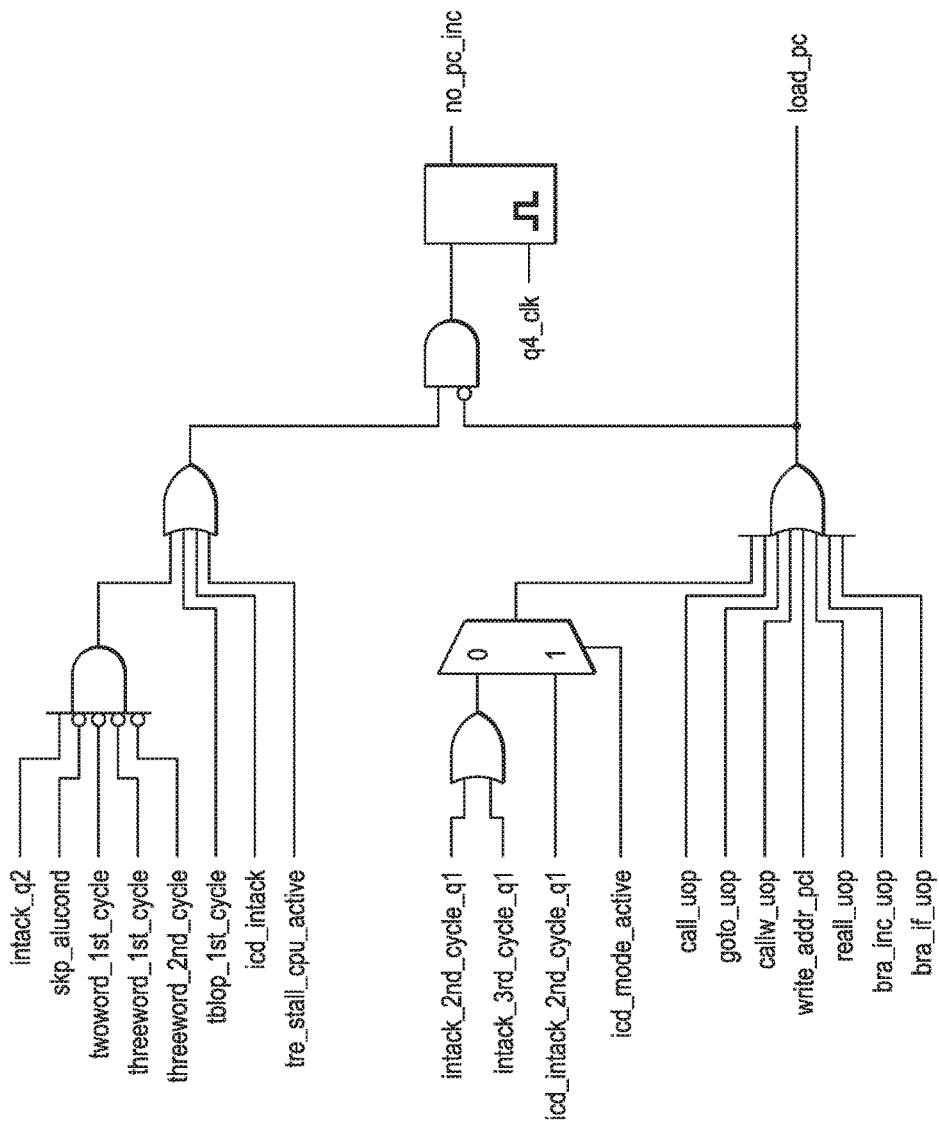
Figure 8E:
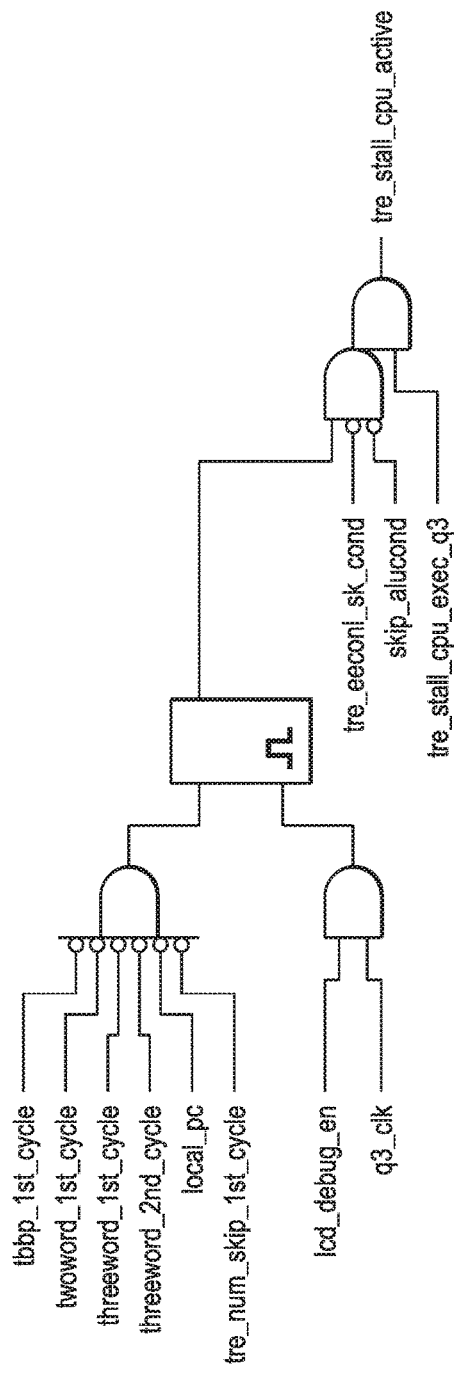
Figure 8F:
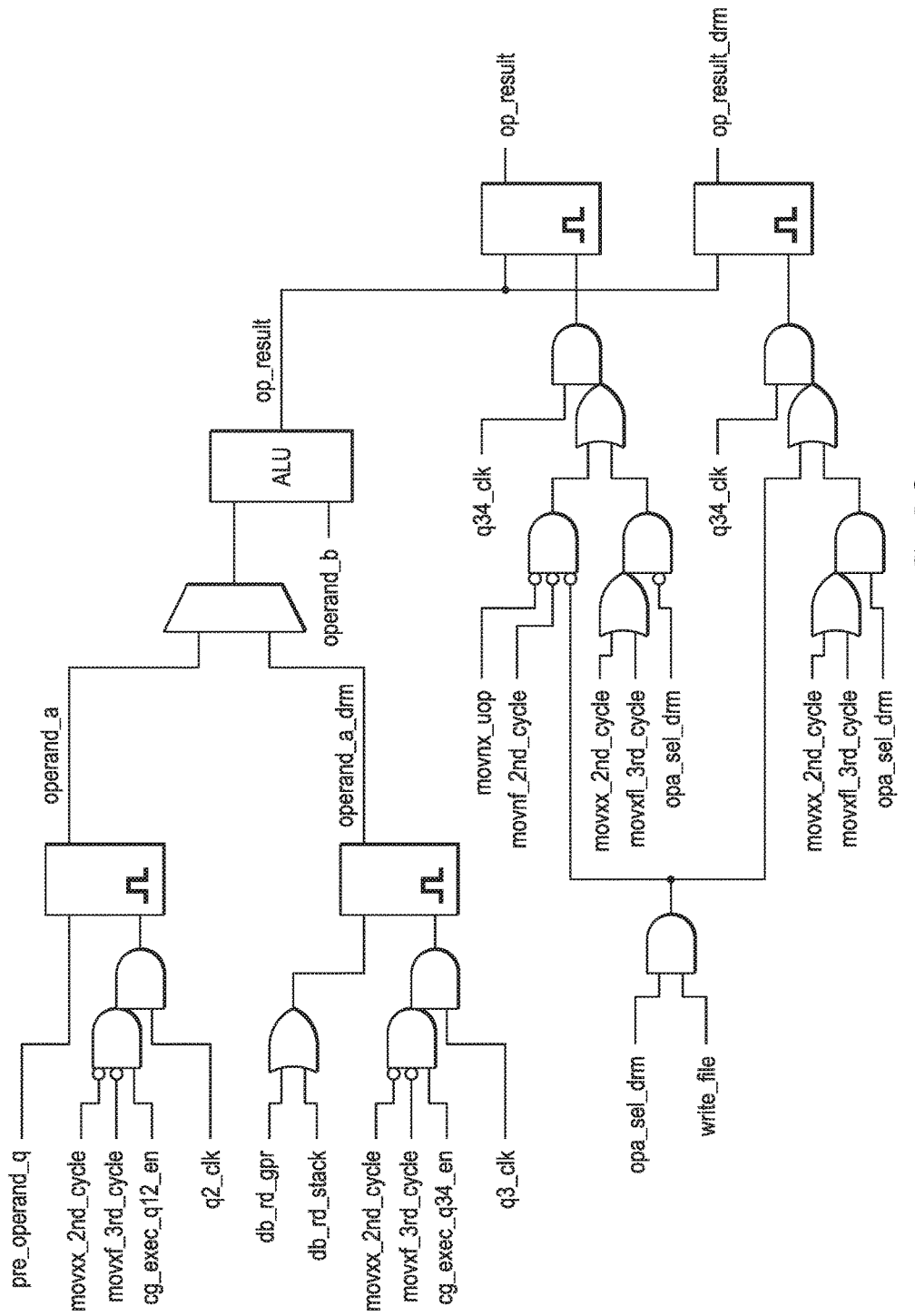
Figure 8G:
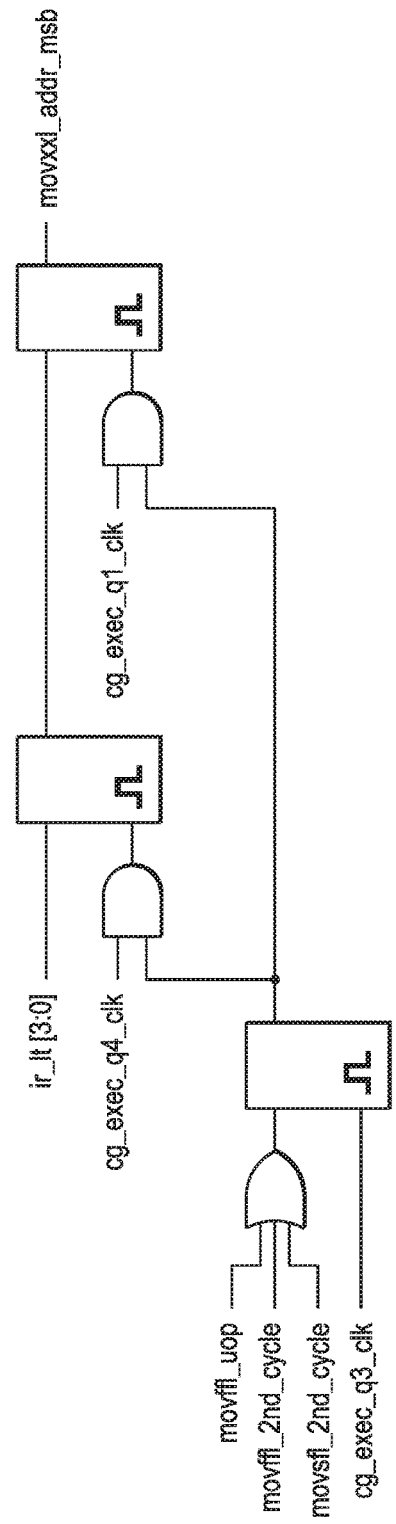
Figure 8H:
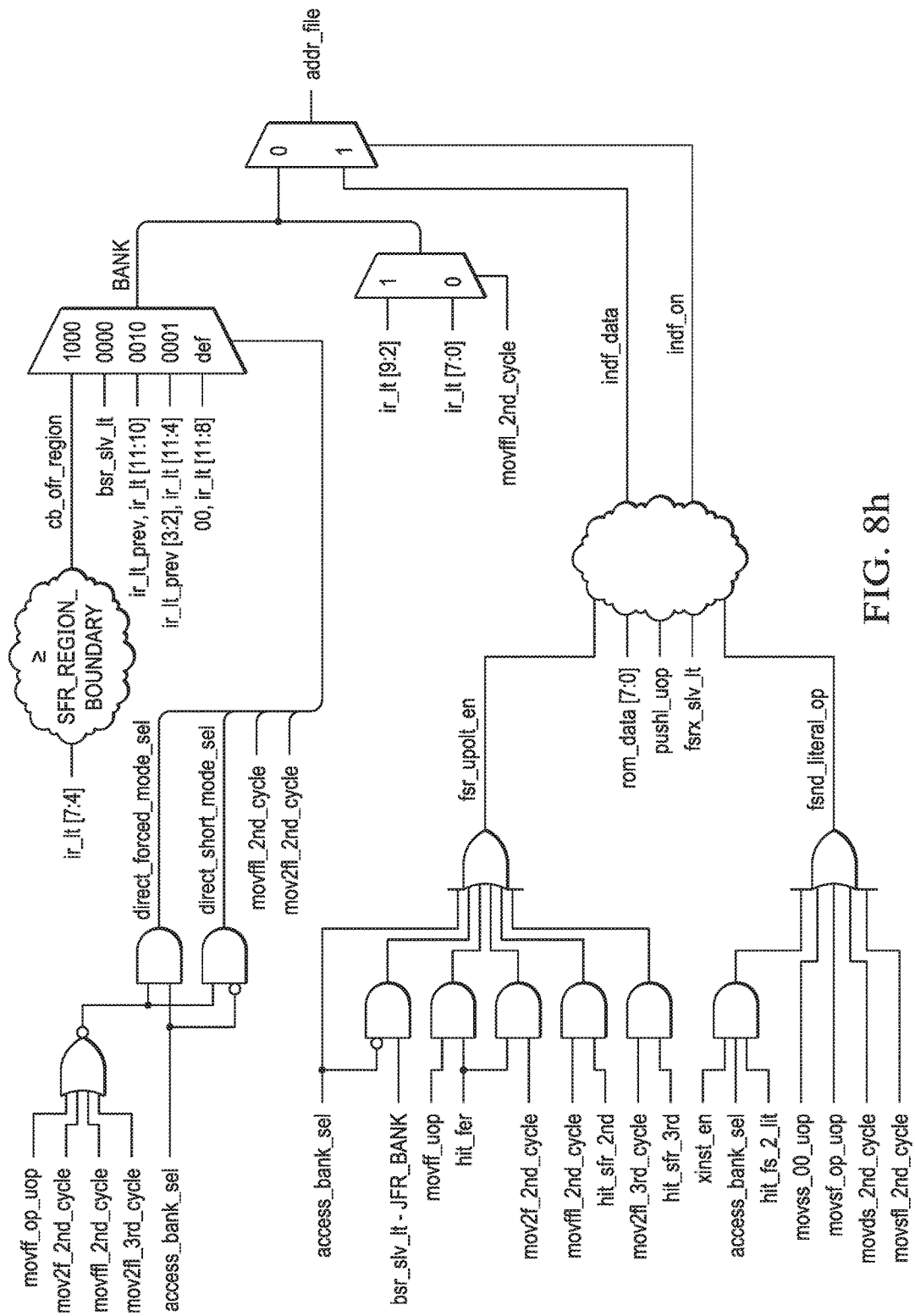

FIGS. 8a and 8b show a three word instruction control circuit. FIG. 8c shows a three word instruction logic circuit for providing forced no operation cycles and a ready to stall signal. FIG. 8d shows a logic circuit for a no program counter increment signal during a three word instruction execution. FIG. 8e shows a possible logic circuit implementation for providing a trc_stall-cpu-active signal. According to one embodiment, this signal is used by the debugger to stall the CPU. Other implementation may not generate such a signal. FIG. 8f shows an ALU logic circuit for operating with a three word instruction. FIG. 8g shows a logic circuit for providing signal movxxl_addr_msb. This signal is used to store up to four bits of the instruction register address from the respective instruction words of the movffl or movsfl instruction to construct the final 14-bit address. For example, for the movffl instruction, the LSB bits 'ffff' are stored from the $1^{st}$ instruction word to assemble the 14 bit source address and the two bits 'gg' are stored from the $2^{nd}$ instruction word to assemble the 14 bit destination address. Similarly, for the movsfl instruction, the two LSB bits 'ff' are stored from the 2$^{nd}$ instruction word to assemble the 14 bit destination address. Thus, this signal can used to assemble the 14-bit address from the 12-bit payloads in multiple instructions. Different distribution designs of the various addresses over the up to three instruction words may apply and require different logic. FIG. 8h shows address file logic circuit for a three word instruction. FIG. 8h shows the circuit that constructs the address for the data space. The bottom half of the circuit is used to construct the address if the source is one of the FSR registers. The top half constructs the address for standard instructions that use BSR or access bank, or for movff, movsf, movss, movffl, and movsfl instructions.

Figure 9B:
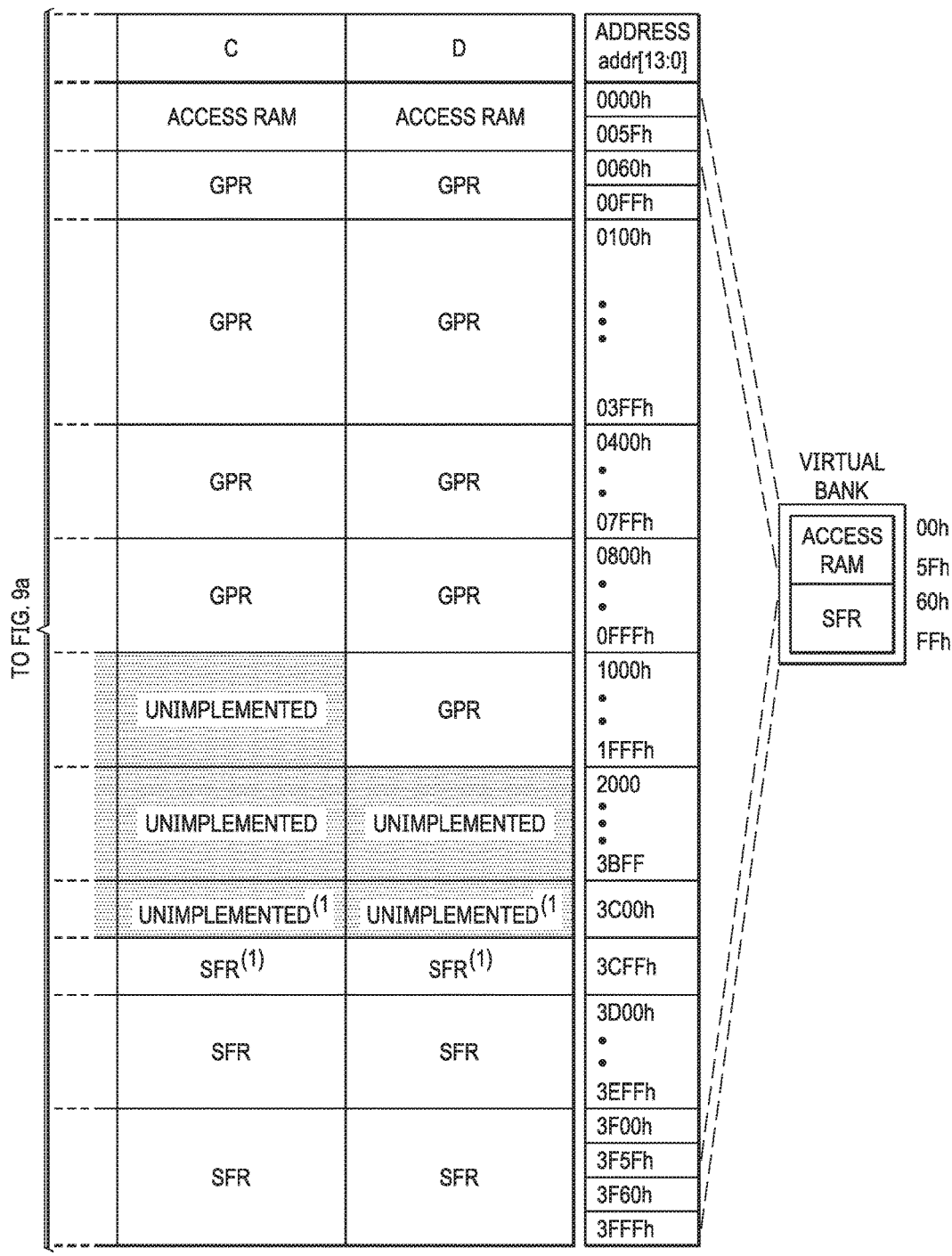

FIGS. 9a-9b show an example of a data memory bank memory map. This map shows a specific implementations for four different devices or families of devices A, B, C, and D, wherein devices A provide for the smallest data memory size and device D for the largest data memory, e.g. 31 banks of general purpose RAM (GPR). These examples do no use banks 32-59. However, other configurations are possible with a data memory using up to 59 GPR. As shown in FIG. 7, the last four banks are used for mapping the special function registers. However, other embodiments may use a different assignment and use of the data memory space. The forced bank access uses a virtual bank as known in the art. Here, the virtual bank is formed by a first portion of the first memory bank 0 and the bottom part of the last memory bank 63. The forced bank access depends on the setting of a single bit in the instruction word and is only relevant if an instruction is limited to a single data memory bank. Thus, this mechanism does not affect the above mentioned move instructions MOVFF, MOVFFL, MOVSF, MOVSFL.

The invention claimed is:

1. An 8-bit microprocessor comprising
   a program memory having a 16-bit instruction word size and a data memory having an 8-bit data size wherein an instruction word has a payload size for an address of up to 12 bits;
   a central processing unit coupled with the program memory and the data memory;
   a bank select register configured to select one of up to 64 memory banks; and
   an indirect addressing register operable to address up to 16 KB of data memory;
   wherein the CPU is configured to execute a first move instruction comprising two instruction words and configured to only access the lower 4 KB of the data memory and a second move instruction comprising three instruction words and configured to access the entire data memory.

2. The 8-bit microprocessor according to claim 1, wherein the bank select register comprises 6 bits.

3. The 8-bit microprocessor according to claim 1, wherein each indirect address register comprises 14 bits.

4. The 8-bit microprocessor according to claim 1, wherein each instruction word comprises an op-code portion.

5. The 8-bit microprocessor according to claim 4, wherein a first instruction word of the first move instruction comprises a 12 bit source address and a second instruction word of the first move instruction comprises a 12 bit destination address thereby limiting access to the lower 4k of the data memory.

6. The 8-bit microprocessor according to claim 4, wherein a first instruction word of the second move instruction comprises 4 bits of a source address and a second instruction word of the second move instruction comprises 10 bits of the source address and 2bits of the destination address and a third instruction word of the second move instruction comprises 12 bits of the destination address.

7. The 8-bit microprocessor according to claim 4, wherein the CPU is further configured to execute a third move instruction comprising two instruction words, wherein a first instruction word of the third move instruction comprises a 7-bit literal offset to a 14-bit indirect address stored in an indirect address register and a second instruction word of the third move instruction comprises a 12-bit destination address which is configured to access only the lower 4K of the data memory.

8. The 8-bit microprocessor according to claim 4, wherein the CPU is further configured to execute a fourth move instruction comprising three instruction words, wherein the first instruction word comprises only op-code, wherein a second instruction word of the fourth move instruction comprises a 7-bit literal offset to a 14-bit indirect address stored in an indirect address register and 2 bits of the destination address and the third instruction word comprises remaining 12-bit of the destination address.

9. The 8-bit microprocessor according to claim 1, wherein a bit in an instruction word determines whether a memory bank as defined in the bank select register is accessed or whether a virtual memory bank combining data memory space of two memory banks is selected.

10. The 8-bit microprocessor according to claim 1, further comprising a hardware multiplier and associated hardware multiplier registers and at least one set of shadow registers configured to automatically save a context when an exception occurs, wherein the context is formed by a working register, the bank select register, a status register, indirect address registers, the hardware multiplier registers and a program latch register.

11. The 8-bit microprocessor according to claim 10, wherein a reduced context is automatically saved in a second set of shadow registers encompassing less registers than said first set of context register when a call instruction is executed, wherein the reduced context is formed by a working register, the bank select register, and a status register.

12. A method for operating an 8-bit microprocessor, comprising:
   providing a program memory having a 16-bit instruction word size and a data memory having an 8-bit data size, wherein an instruction word has a payload size for an address of up to 12 bits;
   providing a central processing unit coupled with the program memory and the data memory;
   providing a bank select register configured to select one of up to 64 memory banks;
   providing an indirect addressing register operable to address up to 16 KB of data memory;
   executing a first move instruction comprising two instruction words and configured to only access the lower 4 KB of the data memory; and
   executing a second move instruction comprising three instruction words and configured to access the entire data memory.

13. The method according to claim 12, wherein the bank select register comprises 6 bits.

14. The method according to claim 12, wherein each indirect address register comprises 14 bits.

15. The method according to claim 12, wherein each instruction word comprises an op-code portion.

16. The method according to claim 15, wherein a first instruction word of the first move instruction comprises a 12 bit source address and a second instruction word of the first move instruction comprises a 12 bit destination address thereby limiting access to the lower 4k of the data memory.

17. The method according to claim 15, wherein a first instruction word of the second move instruction comprises 4 bits of a source address and a second instruction word of the second move instruction comprises 10 bits of the source address and 2 bits of the destination address and a third instruction word of the second move instruction comprises 12 bits of the destination address.

18. The method according to claim 15, further comprising executing a third move instruction comprising two instruction words, wherein a first instruction word of the third move instruction comprises a 7-bit literal offset to a 14-bit indirect address stored in an indirect address register and a second instruction word of the third move instruction comprises a 12-bit destination address which is configured to access only the lower 4K of the data memory.

19. The method according to claim 15, further comprising executing a fourth move instruction comprising three instruction words, wherein the first instruction word comprises only op-code, wherein a second instruction word of the fourth move instruction comprises a 7-bit literal offset to a 14-bit indirect address stored in an indirect address register and 2 bits of the destination address and the third instruction word comprises remaining 12-bit of the destination address.

20. The method according to claim 13, wherein a bit in an instruction word determines whether a memory bank as defined in the bank select register is accessed or whether a virtual memory bank combining data memory space of two memory banks is selected.

21. The method according to claim 12, further comprising providing a hardware multiplier and associated hardware multiplier registers and at least one set of shadow registers, the method further comprises: when an exception occurs automatically saving a context, wherein the context is formed by a working register, the bank select register, a status register, indirect address registers, the hardware multiplier registers and a program latch register.

22. The method according to claim 21, wherein a reduced context is automatically saved in a second set of shadow registers encompassing less registers than said first set of context register when a call instruction is executed, wherein the reduced context is formed by a working register, the bank select register, and a status register.

\* \* \* \* \*